US010582258B2

(12) United States Patent
Lawrence

(10) Patent No.: US 10,582,258 B2
(45) Date of Patent: Mar. 3, 2020

(54) METHOD AND SYSTEM OF RENDERING LATE OR EARLY AUDIO-VIDEO FRAMES

(71) Applicant: Intel Corporation, Santa Clara, CA (US)

(72) Inventor: Sean J Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 14/998,192

(22) Filed: Dec. 26, 2015

(65) Prior Publication Data

US 2017/0188092 A1 Jun. 29, 2017

(51) Int. Cl.
| | |
|---|---|
| H04N 9/475 | (2006.01) |
| H04N 21/44 | (2011.01) |
| H04N 5/04 | (2006.01) |
| H04N 21/436 | (2011.01) |
| H04N 21/4363 | (2011.01) |
| H04N 21/439 | (2011.01) |
| H04N 21/8547 | (2011.01) |
| H04N 21/43 | (2011.01) |

(52) U.S. Cl.
CPC ......... *H04N 21/44004* (2013.01); *H04N 5/04* (2013.01); *H04N 21/4305* (2013.01); *H04N 21/4363* (2013.01); *H04N 21/4392* (2013.01); *H04N 21/43615* (2013.01); *H04N 21/8547* (2013.01)

(58) Field of Classification Search
CPC ......... H04N 21/44004; H04N 21/4305; H04N 21/4363; H04N 21/43615; H04N 5/04
USPC ...................................................... 348/513
See application file for complete search history.

(56) References Cited

U.S. PATENT DOCUMENTS

| | | | |
|---|---|---|---|
| 6,434,606 B1* | 8/2002 | Borella | H04J 3/0632 709/214 |
| 2004/0075765 A1 | 4/2004 | Schoner et al. | |
| 2011/0142139 A1* | 6/2011 | Cheng | H04N 21/4341 375/240.25 |
| 2012/0042102 A1 | 2/2012 | Chung et al. | |
| 2012/0169929 A1* | 7/2012 | Plasberg | H04N 21/44004 348/497 |
| 2012/0230389 A1* | 9/2012 | Laurent | H04N 21/235 375/240.01 |
| 2014/0096165 A1 | 4/2014 | Bei et al. | |
| 2014/0104493 A1* | 4/2014 | Liu | H04N 19/172 348/441 |
| 2016/0308791 A1* | 10/2016 | Subasingha | H04L 12/56 |

FOREIGN PATENT DOCUMENTS

EP 0987897 3/2000

OTHER PUBLICATIONS

Friedman et al., "RTP Control Protocol Extended Reports (RTCP XR)", Internet Engineering Task Force; https://tools.ietf.org/html/rfc3611; Nov. 2003, 55 pages.
International Search Report & Written Opinion dated Feb. 22, 2017 for PCT Patent Application No. PCT/US2016/063887.

* cited by examiner

*Primary Examiner* — Jefferey F Harold
*Assistant Examiner* — Omer Khalid
(74) *Attorney, Agent, or Firm* — Green, Howard & Mughal LLP

(57) ABSTRACT

A system, article, and method of rendering late or early audio-video frames.

20 Claims, 12 Drawing Sheets

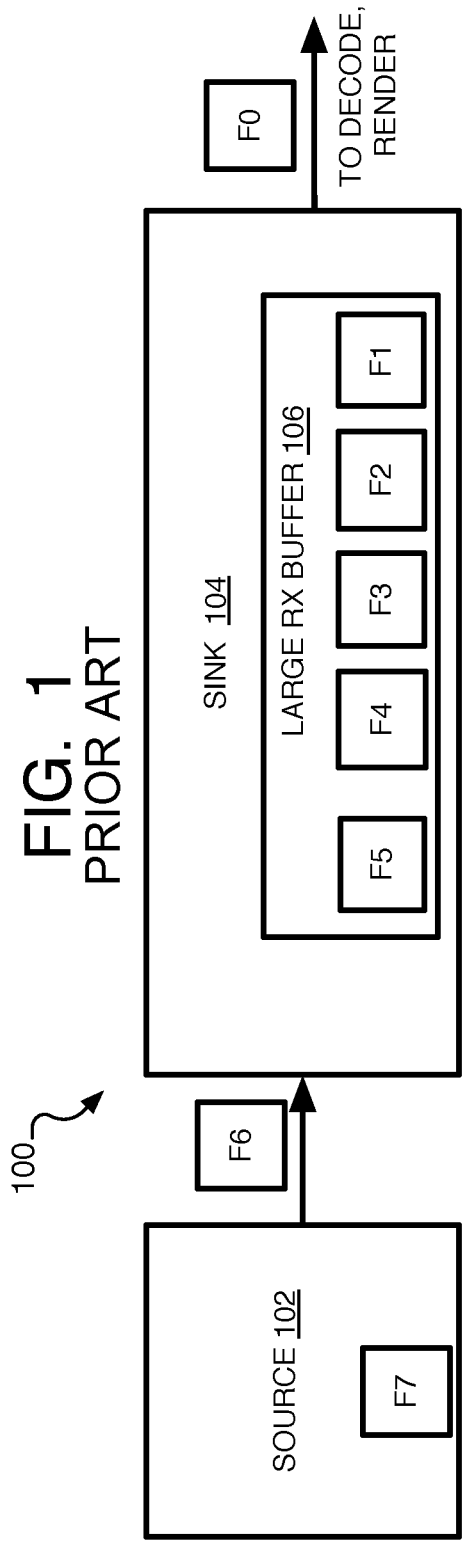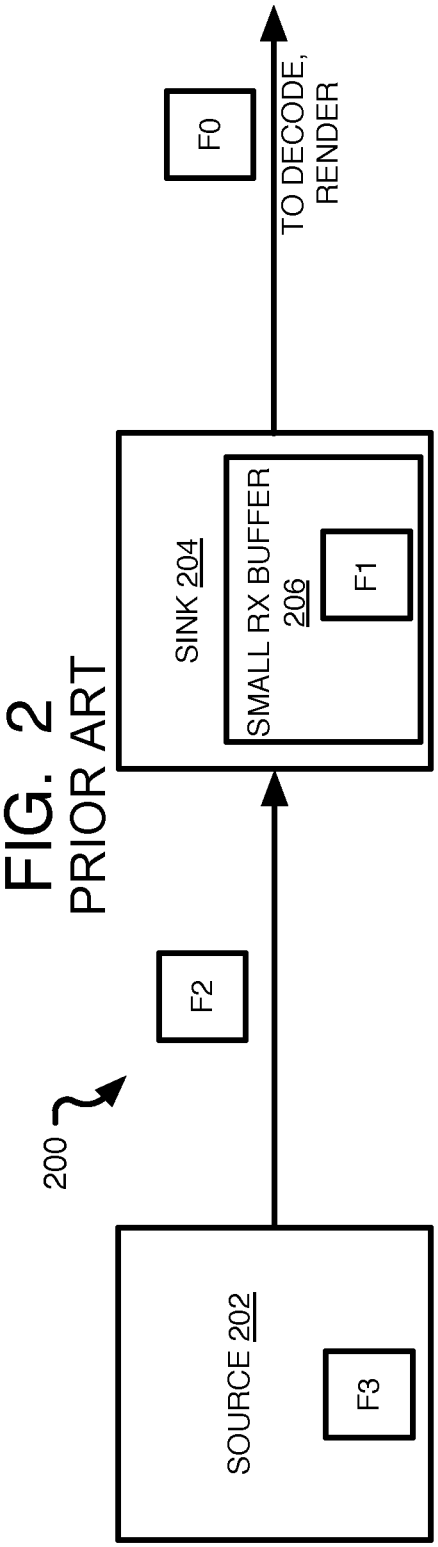

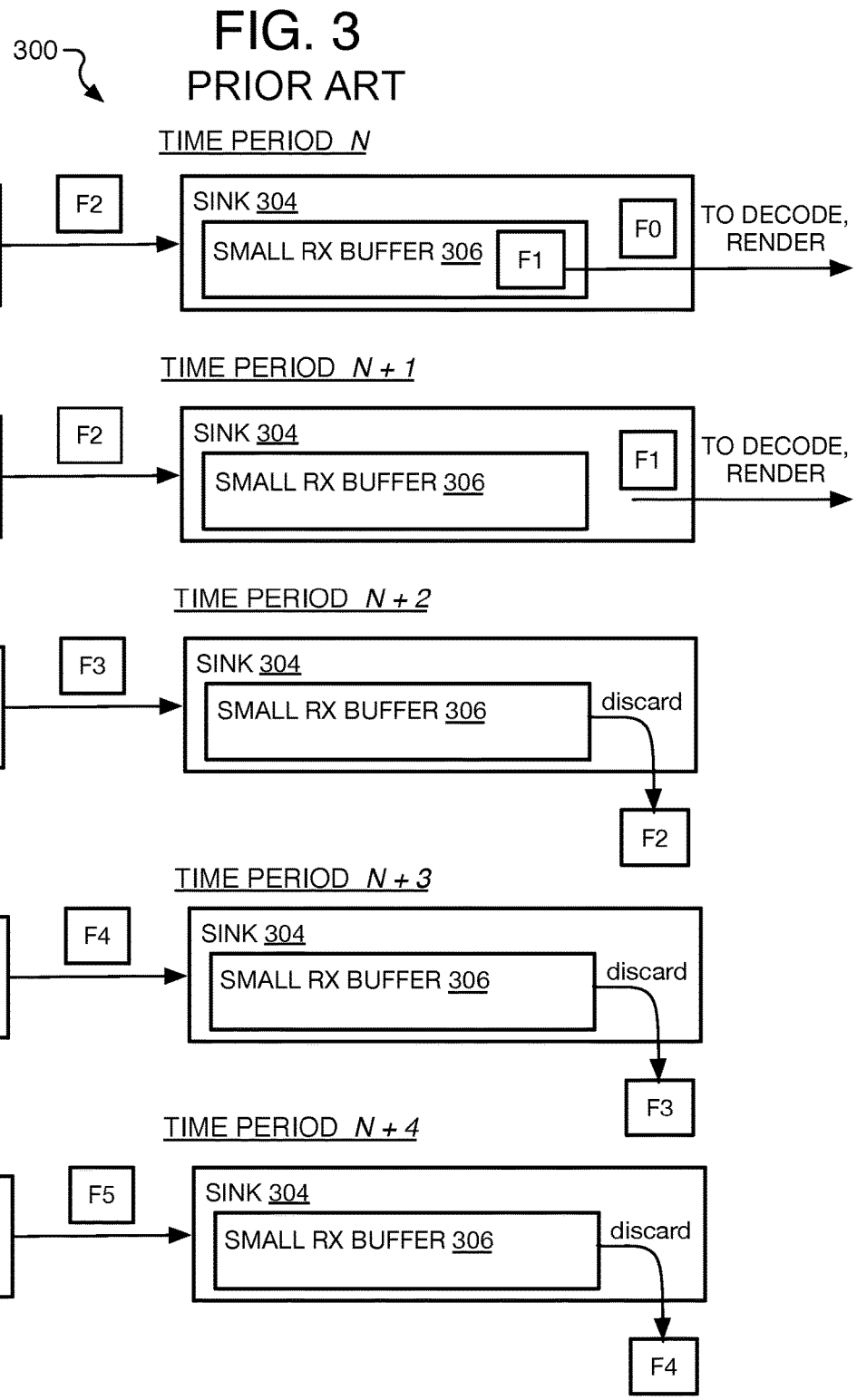

500

METHOD AND SYSTEM OF RENDERING LATE OR EARLY AUDIO-VIDEO FRAMES

BACKGROUND

A number of short-range or personal area network (PAN) mirroring systems transmit video and/or audio files, or otherwise what is viewed on the screen and audible on a transmitting device, and typically to a remote receiving device that is more convenient or provides a better experience for viewing or listening to the video and/or audio. For example, a movie may be played or processed on a smartphone while viewing the video of the movie and listening to the audio on a large television. In other examples, the screen of a laptop may be transmitted to a conference room projector, or a cable box may transmit a show to a smaller device such as a tablet in addition to, or instead of, the television.

In order to transmit media that includes audio and/or video data, these PAN systems establish a balance between quality and latency. Specifically, in order to raise the quality of the audio and video (AV), a sufficient number of frames associated with packets of AV data are stored in a jitter buffer (or more accurately, de-jitter buffer) at the receiving (or sink) device ready for decoding and rendering (display of video and emission of audio). The buffer holds the frames until a decoder is ready for the frames. If the buffer is too small, frames that arrive early at the receiver are dropped when there is no capacity to hold the frames in the buffer. On the other hand, when the frames are late according to the decoder's clock at the receiver, the frames also are dropped instead of being stored in the buffer, and these late arrival drops may occur regardless of the size of the buffer. Either way, the dropped frames may cause audio and video drops that create a pause in the audio and/or video that can be noticeable to a user especially when a sequence of frames is dropped.

To at least resolve issues with a small jitter buffer, the jitter buffer capacity could be increased. The larger the jitter buffer for storing more frames, however, the greater the latency between the display (or processing) of a video and audio on the transmitting device and the rendering of the video and audio on the receiving device due to the time it consumes for a frame to be fetched in a certain order (such as first-in, first-out (FIFO)) from the buffer. The latency may result in noticeable delays in a video display and/or audio emission, or becomes difficult or even impossible to use the transmitting device to control what is viewed on the receiving device (such as with video games or by controlling a cursor at the source and that is viewed at the receiver). The conventional mirror systems still inadequately compensate for changes in streaming delays from the transmitter to the receiver resulting in too many audio or video drops or too much latency.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of an AV processing system with a large jitter buffer;

FIG. 2 is a schematic diagram of an AV processing system with a small jitter buffer;

FIG. 3 is a schematic diagram showing a series of operations of a conventional AV processing system;

DETAILED DESCRIPTION

Figure 4:
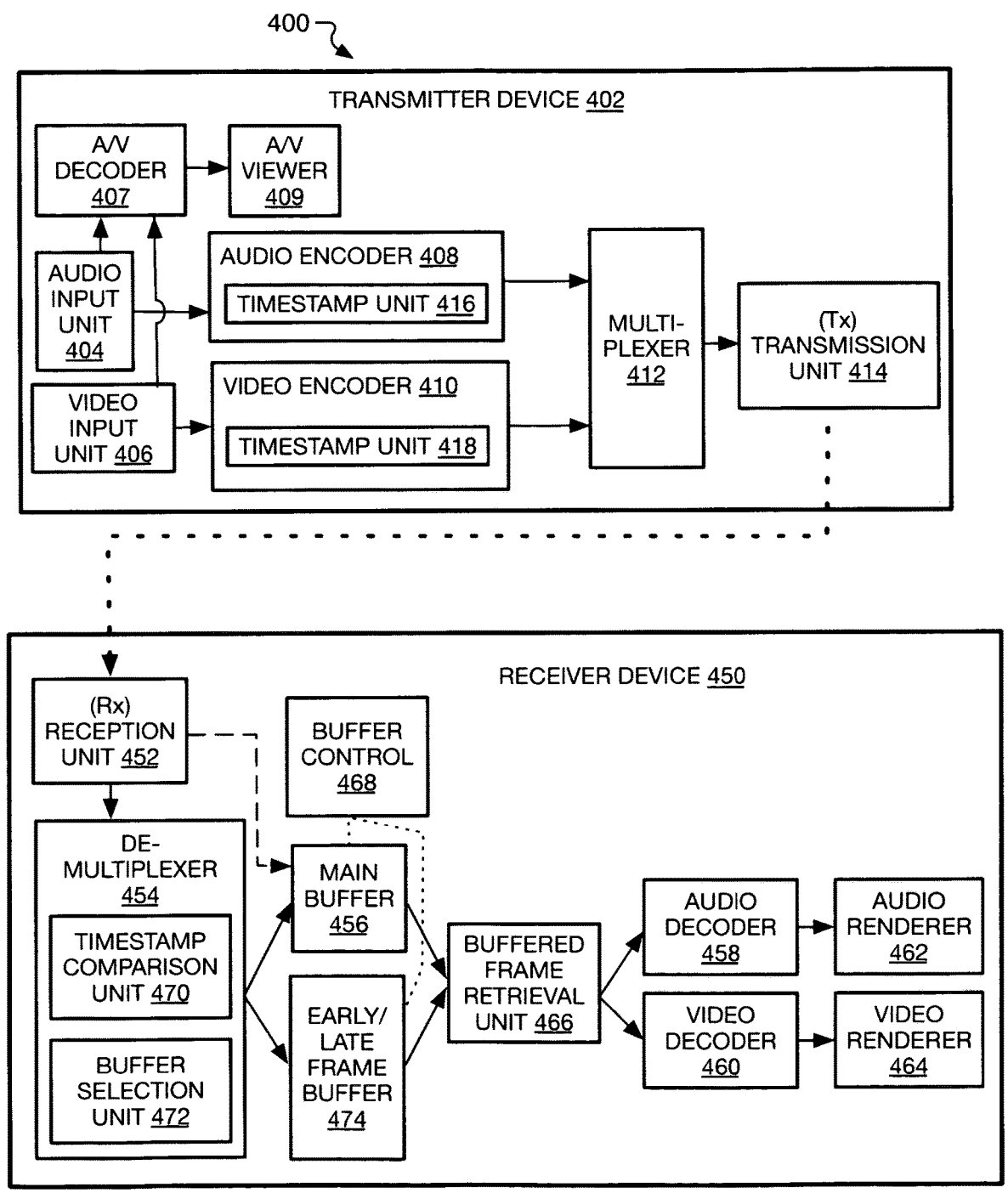
FIG. 4 is a schematic diagram of an example AV processing system used to perform the methods of rendering late or early audio-video frames in accordance with the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones and other wearable smart devices such as smartglasses, smart watches, exercise bands, or smart headphones, video game panels or consoles, high definition audio systems, surround sound or neural surround home theatres, televisions, television set top boxes, projectors, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of rendering late or early audio-video frames.

As mentioned, a number of short-range mirroring or PAN systems provide a way to transmit images and/or audio from a transmitting device to a remote receiving device for viewing and listening. The transmitting device may be processing or playing the video and/or audio during the transmission to the receiver. For example, a movie may be played on a smartphone while both viewing the video of the movie and listening to the audio on a large television. In other examples, the screen of a laptop may be transmitted to a conference room projector, or a cable box may transmit a show to a smaller device such as a tablet in addition to, or instead of, the television. By another example, audio being played on a small device such as a smartphone may be streamed to a remote speaker that amplifies and emits the sound. Other examples include short range wireless displays with wireless docking. These systems are often described as wirelessly replacing the connection wire from the computer to the display and/or speaker.

Referring to FIG. 1, as mentioned, these mirroring systems attempt to establish an acceptable balance between AV quality and latency. Specifically, a number of frames associated with audio and/or video packets are stored in a buffer, such as a jitter buffer, at the receiving (or sink) device and ready for decoding and display or audio emission through one or more speakers. The buffer may be relatively large so that the buffer has the capacity to hold frames that arrive early and cannot be immediately fetched by the decoder and renderer of the receiver.

Thus, in one example for explaining this difficulty, an AV processing system 100 may have a transmitter or source 102 that has AV encoded and placed in a bitstream. The bitstream is then transmitted or wirelessly streamed to a receiver or sink 104. The sink 104 may have a large receiver (Rx) buffer 106, such as a jitter buffer. As shown, frames F0 to F7 of an AV sequence are being processed ultimately for decoding and rendering. Frame F7 may be being processed for display at the transmitter as well as in the encoding process for placement into the bitstream. Frame F6 is being transmitted in the bitstream, while frames F1 to F5 are sequentially held in the buffer 106, and frame F0 was removed from the buffer as the first frame in the sequence, and for decoding and rendering. This larger buffer 106 increases audio and video quality by providing more capacity for early frames resulting in fewer audio and video drops, which cause pauses with no sound or images which is noticeable to a user, and better playback quality.

On the other hand, increasing the capacity of the jitter buffer has some disadvantages as well. Since the frames are fetched from the buffer 106 in FIFO order for example and are delayed for the time it takes to get through the buffer (to obtain frames F1 to F5 one-by-one in the buffer 106 for example), the larger the capacity of the buffer for holding frames or packets with audio and/or video data, the greater the latency which is measured as the time between the playing or processing of a video and/or audio on the transmitting device (frame F7 for example) and the rendering of the video and/or audio on the receiving device (frame F0 for example) such that noticeable delays in audio and video may occur. As mentioned above, the delays may be so severe that noticeable pauses may occur during the rendering of the AV, and attempting to control the audio and video displayed by the receiver by using inputs at the transmitter (such as attempting to fast forward or rewind the audio and video to a certain place in the AV sequence, or by controlling a mouse as viewed at the source to move the mouse on the display of the sink) may be very difficult if not impossible.

Referring to FIG. 2, thus, achieving low latency streaming of audio and video is particularly important in desktop to wall screen mirroring scenarios for example, and is performed by use of a smaller jitter buffer at the sink so that a minimal amount of audio and video packets are stored in the buffer before decode and render. By one specific example, an AV processing system 200 may have a source 202 that streams AV to a sink 204 that has a small Rx Buffer 206 here shown only holding a single frame F1. By this arrangement then, the small jitter buffer 206 at the receiver would result in low latency where only four frames (F0 to F3) represent the latency from display or processing on the transmitter to the rendering on the receiver. In this case, however, since the buffer has such a small capacity, frames or packets that are early may be dropped when there is no space for the frame in the buffer. This results in more frame drops which may result in skips in the AV. When a sequence of frames is dropped, this can create a noticeable pause or skip in the AV. As mentioned, increasing the buffer size is used to attempt to reduce the number of AV drops.

The tradeoff between latency and playback quality is conventionally handled in one example by using transmitters with optimized or default settings that are specifically configured for certain receivers (such as receiver product types or models with particular components) to achieve optimum playback quality with the lowest latency possible. When the transmitters, however, are used with other receivers that have different data pipeline settings than what is expected by the transmitter, or the specified receivers are not performing as predicted, often the result is a large latency or poor playback quality that is sufficiently significant to affect the user experience.

Other current solutions attempt to make the AV streaming between a source and a sink more robust at the WiFi PHY (physical layer) and MAC (media access control) layers so that data arrives at the sink on time. While this may improve the transmission somewhat, in the presence of sufficient wifi interference, however, the problem remains significant. Also, if the source is sufficiently loaded with running applications consuming resources, it can affect transmission performance of the source also resulting in late AV packets/frames resulting in them being dropped and not rendered at the sink.

Otherwise, adaptive jitter buffers are used that have a variable capacity but the capacity is set by calculating the average clock interval for a certain amount of data so that the buffer size may be optimized to play data at an adjusted clock rate to increase AV quality. Such a system, however, is often inadequate.

As mentioned, another difficulty that arises is when the frames in the transmitted bitstream arrive too late to the sink. This may occur due to the computational load on the transmitter or due to congested WiFi or wireless display (WiDi) networks, and so forth. The AV packets that arrive late at the sink still may be dropped and not rendered. This occurs in the conventional system because the receiver determines whether the presentation time stamp of an AV packet is within a margin of the current clock value of the decoder. When the time is within the margin, the frame or AV packet is placed in (or maintained in) the buffer for subsequent decoding and rendering. When frames are late to the receiver and the margin limit of the decoder clock has passed, the receiver will drop the late frames even when there is capacity for the frames in the buffer. In this case, the buffer capacity is irrelevant. The dropping of the late frames, as with dropping early frames, also may cause noticeable pauses or annoying breaks in the AV being rendered, or may result in difficulty controlling the audio and video on the receiver by using controls at the transmitter.

Referring to 3, an example AV system 300 is shown performing a number of sequential operations in order to explain the problems of the conventional systems mentioned above. Thus, a source or transmitter 302 compresses a video sequence of frames F0 to Fn and transmits them to a sink or receiver 304 that has a small Rx (receiver) Buffer 306. As shown at time period N, frame F3 is being compressed or otherwise processed by the source F3 (which refers to the fact that it may not always include compressed data), frame F2 is being transmitted to the sink 304, frame F1 is held in the buffer 306, and frame F0 was retrieved from the buffer 306 for decoding and rendering. The system at time period N+1 shows that frame F2 is being delayed, by network load or other reasons for example, so that while frame F1 has been retrieved from buffer 306 for decoding and rendering, buffer 306 is empty of frames when frame F2 should have been placed in the buffer. Thus, frame F2 is considered a late frame, and as shown at time period N+2, frame F2 is dropped or discarded since its timestamp will be too small and outside the margin of the decoder clock. Since, in this example, following frames F3, F4, and F5 also are now late, these frames also re discarded upon being received by the sink 304 as shown. Dropping a sequence of frames like this very well may cause a long, noticeable, annoying pause in AV to a user viewing the rendered AV as there would be no new frames to render. Recovery of this type of scenario would happen only when an on-time frame arrives at the sink and continues receiving on-time frames from that point. Thus, the system awaits for this recovery which may or may not happen.

To resolve these issues, the method and system presented herein store frames that arrive early or late to a main jitter buffer at the sink (or receiver) and, instead of simply dropping those frames, the frames are stored at at least one additional jitter buffer. The system then renders those early or late frames, and by one form, renders the early or late frames as long as frames remain early or late, which improves the user AV experience by reducing pauses in the AV. Once the frames are back on time, as determined by the timestamps of the frames relative to a decoder or other clock, the frames are retrieved from the main buffer again. Any remaining frames in the additional jitter buffer may be discarded. This permits an improved AV system that minimizes frame drops while using small jitter buffers. Other details are provided below.

It will be appreciated that AV or audio-visual here generally refers to the use or inclusion of either audio or video (images) or both.

Referring to FIG. 4, an AV processing system 400 may perform the implementations of adjusting AV quality and latency by using an additional buffer as described herein. While the example of system 400 is explained as an AV processing system, it will be understood that at least some of the aspects of the methods and system described herein may be operated on a system that is only using an audio signal without video or vice-versa. System 400 discloses a data pipeline of an audio-video mirroring system which may be a screen mirroring system or personal area network (PAN). Particularly, a transmitter device (or just transmitter or source) 402 may be communicatively coupled or paired to a remote receiver device (or sink or simply receiver) 450 to transmit a bitstream with either an audio data signal, a video data signal, or an audio-video (AV) data signal to the receiver device 450. The methods herein are particularly suited for wireless transmission of the AV bitstream but some implementations may be wired. For AV systems, the transmitter 402 may be a smartphone, tablet, laptop computer, or other computer that transmits both audio and video and/or either alone.

By one implementation, the transmitter 402 has an audio input unit 404 and a video input unit 406. The audio and video for the input units may be obtained from a wide variety of upstream sources. This includes from volatile or non-volatile memory on the transmitter or accessible by the transmitter, audio and video streamed to the transmitter over wide area networks (WANs) such as the internet and/or other telecommunications networks, or provided over local area networks (LANs) such as that within an office, residence, or other facility. The transmitter and receiver also may be, may be part of, or may have one or more cameras and audio capture devices such as one or more microphones. Many arrangements are possible.

Once obtained from the audio and video input units 404 and 406, the audio and video data streams may be respectively provided to an audio encoder 408 and a video encoder 410. Additionally, when the transmitter 402 has the capability to display and/or play audio and video input, the transmitter 402 may have an AV decoder 407 that provides decoded AV data to an AV viewer 409. Thus, in some cases it may be possible to view the video on the transmitter while also viewing the video on the receiver. In some cases, the viewer 409 may be turned off while paired to the receiver. The AV decoder 407 may implement a codec compatible with that implemented by AV source upstream of the transmitter when so provided and to generate audio and video data streams which are then (re)encoded by the encoders 408 and 410 suitable for direct wireless transmission to receiver 450.

Encoders 408 and 410 may receive audio data and video data inputs in digital form, respectively, and may output a compressed (or otherwise processed and/or non-compressed) digital audio data stream and digital video data stream, respectively, as a representation of the inputs. The input units 404 and 406, or encoders 408 and 410, also may perform pre-processing on the data sufficient for the encoders to compress the data. The encoders 408 and 410 may implement any codec known to perform one or more of transformation, quantization, motion compensated prediction, loop filtering, and so forth. In some implementations, audio encoder 408 complies with one or more pulse code modulation (PCM) or linear pulse code modulation (LPCM) specifications such as 20 Digital Dolby AC-3, Dolby TrueHD, or Advanced Audio Coding (AAC), and so forth. In some implementations, video encoder 410 complies with one or more specifications maintained by the Motion Picture Experts Group (MPEG), such as, but not limited to, MPEG-1 (1993), MPEG-2 (1995), MPEG-4 (1998), and associated International Organization for Standardization/International Electrotechnical Commission (ISO/IEC) specifications. In some exemplary implementations, encoders 408 and 410 comply with one or more of H.264/MPEG-4 AVC standard, HEVC standard, VP8 standard, VP9 standard specifications, and so forth.

The audio encoder 408 and video encoder 410 also may have timestamp units 416 and 418 that provide timestamps for the frames. As one example, the timestamps may be presentation time stamps (PTSs) that are set to the value of the encoder (or other) clock and are part of the output of the encoders for placement in the MPEG transport stream or MTS for each frame (or each audio and/or video packet). The PTS are used by a receiving device to set the presentation time (or display time) of a given video packet and audio packet that is associated with a single frame by one example and relative to other frames in an AV sequence. Thus, the timestamp units may very well work in conjunction (or be a single combined timestamp unit) to assign the corresponding audio and video packets to the same frame and timestamp of that frame. Also, other types of timestamps could be used instead such as a transmission timestamp. The timestamps can be used to determine whether a frame is arriving early, on-time, or late to the jitter buffer at the receiver by comparing the timestamps to a clock at the receiver as explained in detail below.

System 400 also may include a multiplexer 412 to multiplex the coded elementary streams into a higher-level packetized stream that further includes a metadata field specifying a presentation synchronization of the elementary stream packets. In some implementations, multiplexer 412 codes the packetized elementary streams (PESs) into an MPEG program stream (MPS), or more advantageously, into an MPEG or multiplexed transport stream (MTS). The presentation timestamps (PTSs) may be assigned in the PES packet layer. In further implementations, the MTS is encapsulated following one or more of Real-Time Protocol (RTP), user datagram Protocol (UDP) and Internet Protocol (IP) as implementations are not limited in this context. In some RTP implementations for example, a Network Abstraction Layer (NAL) encoder (not depicted) receives the MTS and generates Network Abstraction Layer Units (NAL units) that are suitable for wireless transmission. While exemplary implementations described in detail herein make reference to "PTS", metadata or MTS fields of a different name but nonetheless used to set the presentation time or frame decoding order may be similarly used. For example, where an RTP payload is a PES rather than a MTS, the RTP timestamp may serve to set the presentation time of a given audio and video frame.

The transmitter 402 also may include a (Tx) transmission unit (or transceiver) 414 that may form a WIFI or other network transmitter stack and may be a wireless transmission device that obtains the coded stream data from the multiplexer 412, and then outputs a wireless signal representative of the coded stream data to a sink device 450, and in one form, directly to the sink 450. The transmission unit 414 may utilize any band known to be suitable for the purpose of directly conveying (e.g., peer-to-peer) the stream data for real time presentation on a sink device. The transmission unit 414 may operate in the 2.4-GHz and/or 5 GHz band (e.g., Wi-Fi 802.11n), and in some forms in the 60 GHz band. The transmission unit 414 may further support and/or comply with one or more High Definition Media Interface (HDMI) protocols, such as Wireless Home Digital Interface (WHDI), Wireless Display (WiDi), Wi-Fi Direct, Miracast, WiDock, WirelessHD, or Wireless Gigabit Alliance (WiGig) certification programs.

Turning now to the receiver or sink, the receiver device 450 may be any compatible device that at least emits sound and/or displays images from frames of a video (or audio) sequence, and is communicatively coupled or paired to the transmitter 402 to receive a wireless transmission of audio and/or video data. To accomplish these features, the receiver 450 may have a Rx reception unit 452 that receives and forms a WiFi or other network receiver stack of the frames of audio and/or video from the transmitted bitstream. The reception unit 452 may use any frequency band and wireless communication protocol compatible with that of the transmission unit 414. The output of the reception unit 452 is provided to a de-multiplexer (or demux) 454, which is to process the encapsulated packetized streams into separate audio and video compressed data inputs when both are provided. Demux 454 includes logic to unencapsulate and extract audio and video payloads from the packetized AV stream. In one form, demux 454 includes logic to de-multiplex the packet payloads based, at least in part, on the MTS field specifying the presentation timestamps of the elementary stream packets.

Particularly, the de-multiplexer presents the audio and video data for rendering based on the PTS of the data of a frame by extracting the PTS of each audio and video packet for a frame, and using a timestamp comparison unit 470 to compare the PTSs to the decoder (or renderer) clock. By one example, when the timestamp of a frame is within a certain margin of the decoder clock, a buffer selection unit 472 first places the frame with its associated audio and video packets in a main buffer 456, which may be a main jitter buffer. The buffered frame then can be retrieved by a buffered frame retrieval unit 466 for decode and render. The de-multiplexer may be one example of a buffering decision unit 454 that has the timestamp comparison unit 470 and buffer selection unit 472.

Receiver device 450 stores frames on the main buffer after the analysis by the demux 454 in which case the demux will be able to make informed decisions about what kind of data is placed in the buffer. By one option, the main buffer 456 may be considered a component of the demux 454, but the operations are similar in that the demux will decide which frames are to be placed in the main buffer.

Alternatively, frames from a bitstream may be stored in the main buffer 456 before the demux 454 performs the buffer selection operations on the frame (as shown by the dashed arrow) in which case all received or input frame data are first placed in the main buffer 456 before the demux's buffer selection operations removes frames from the main buffer 456 and places the frames in the early/late frame buffer 474, and depending on the timestamp comparison as well as the buffer capacity as described herein.

Regarding the timestamp to clock comparison, if the PTS is earlier (or less than) the decoder clock by a certain margin such that the timestamp of the frame has already passed, it is considered having arrived late. On the other hand, when the timestamp is later than a certain margin of the decoder clock such that the time stamp value has not occurred on the decoder clock yet, the frame is considered to be early. Alternatively, when the frame arrives and there is no capacity for the frame, it may be determined that the frame is early without the need to compare it to the clock.

When the frame is early or late relative to the margin of the decoder clock, the buffer selection unit 472 places the frame into the early/late frame buffer (or second or additional buffer) instead of being dropped to avoid further AV pauses. The buffered frame retrieval unit 466 then proceeds by retrieving the early or late frames from the early/late frame buffer (ELFB) until the PTS numbers catch up, and on-time frames arrive to the main buffer 456. Once that happens, the buffered frame retrieval unit stops obtaining frames from the early/late frame buffer 474 and retrieves frames from the main buffer 456 again. The details are provided below.

The buffers 456 and 474 may be or have a dynamic jitter buffer. Each buffer may include multiple buffer (or sub-buffers) with one buffer for each PES, or in other words, one audio buffer for audio data packets and a video buffer for video data packets. The buffers 456 and 474 may be formed by writing the data to memory whether a permanent memory or a temporary memory such as RAM, cache or any other memory that can provide a sufficient transaction speed and capacity, and may or may not be considered a main memory. A buffer control 468 may be provided to control the size of the buffer when the buffer is a dynamic buffer, and other parameters, and may be activated by instructions in the bitstream received from the transmitter. One example jitter buffer protocol for real-time transport protocol (RTP) control protocol (RTCP) is provided by Friedman et al., *RTP Control Protocol Extended Reports (RTCP XR)*, Internet Engineering Task Force (November 2003) (also found at https://tools.ietf.org/html/rfc3611). Many other buffer standards and protocols may be used as well.

Audio decoder 458 and video decoder 460 may retrieve a frame from the buffer 456 when the PTS of the frame matches (or is within a margin of) the decoder clock value. Decoders 458 and 460 may use any codec compatible with that of encoders 408 and 410 to generate decoded digital audio data and digital video data that represents the input data. Thus, the decoded data provided by the audio decoder 458 and video decoder 460 represents the input audio and video, in turn the audio and video signals transmitted in the bitstream to the receiver 450. Audio renderer 462 and video renderer 464 receives the audio and video data and forms an audio rendering pipeline that may terminate at one or more audio speakers and a video rendering pipeline that terminates at one or more displays. The audio renderer 462 and video renderer 464 may include any equipment that modifies or enhances the audio and video data before the audio and video is played. This may include amplifiers, equalizers, and so forth for audio, and scaling, 3D processing, and so forth for video.

Figure 5:
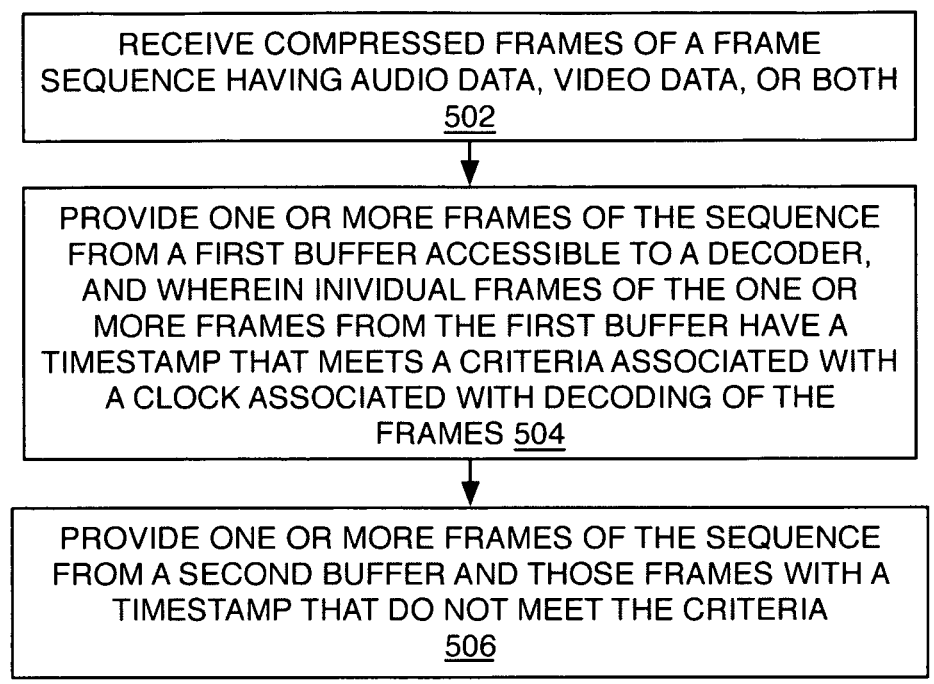
FIG. 5 is a flow chart of a method of rendering late or early audio-video frames in accordance with the implementations herein.

Referring to FIG. 5, an example process 500 of rendering late or early audio-video frames is provided. In the illustrated implementation, process 500 may include one or more operations, functions or actions as illustrated by one or more of operations 502 to 506 numbered evenly. By way of non-limiting example, process 500 may be described herein with reference to example AV processing devices of any of FIGS. 4, 7-8, 10-12, and where relevant.

Process 500 may include "receive frames of a frame sequence having audio data, video data, or both" 502. In other words, this operation is directed to the transmission or streaming of a bitstream with AV data and of an audio and/or video signal formed of frames of an AV sequence. By one form, a time-ordered frame processing unit such as a device with a decoder (or the decoder itself) has buffers holding the data as compressed data of the frames, and in PAN cases, the device may include a display for rendering the AV as well. While the examples herein discuss the data in terms of compressed data, it will be understood that the received data need not always be compressed data. The details of the received frames is described in greater detail herein.

Process 500 also may include "provide one or more frames of the sequence from a first buffer accessible to a time-ordered frame processing unit, and wherein individual frames of the one or more frames from the first buffer have a timestamp that meets a criteria associated with a clock associated with the time-ordered frame processing unit" 504. In particular, the buffers may be jitter buffers and that hold frames for the time-ordered frame processing unit which may be a decoder for example, and that store frames awaiting to be decoded. As explained herein, a unit such as a de-multiplexer at the receiver may compare the timestamps of the frames to a decoder (and/or renderer) clock. Those timestamps with a value that is within a margin of the clock are considered on-time frames, and the on-time frames are placed (and/or maintained) in the first or main buffer where the frames are available to be provided to a decoder for eventual rendering. By one example, each frame may have a timestamp compared to the clock. It will be understood that the comparison may be applied in intervals or only as deemed needed, such as when large computational loads are anticipated, and the methods are then activated. The details are provided below.

Process 500 also may include "provide one or more frames of the sequence from a second buffer and those frames of the sequence with a timestamp that do not meet the criteria" 506. In particular, when the frames have timestamps that do not fall within the margin of the decoder clock, those frames are late or early and are conventionally dropped causing the pauses in AV as mentioned above. In the current case, however, the early and late frames are stored in at least one additional or second early/late frame buffer. By one example, a de-multiplexer makes this decision (whether a frame is late, early, or on-time) before placing the frame into either the first main buffer or the second buffer. By other examples, the early or late frames, and typically by definition just the late frames, may be placed in the first main buffer before the decision is made. In that case, any frame found to be a late or early frame is then removed from the first main buffer and placed in the second buffer. The decoder, or frame retrieving unit, can then obtain, or be provided with, the late or early frames from the second buffer which avoids noticeable pauses when those late or early frames are rendered.

By some forms, these operations also may include providing the early or late frames from the second buffer as long as no on-time frame exists in the first main buffer. For example, while early and late frames are being provided from the second buffer, as soon as an on-time frame is ready to be provided to a decoder in the first main buffer, the retrieval of the frames switches back to the first main buffer from the second buffer. Also, by one form, any remaining early or late frames in the second buffer at this point are removed from the second buffer and discarded (i.e., the second or early/late frame buffer is flushed). Other details are provided below.

It will be understood that the two (or more as explained below) buffers may be provided on the same memory or different memories. It also will be understood that the two (or more) buffers may actually form different portions of the same single buffer. Many variations are possible as long as frames or packets of image data can be moved in and out of each buffer.

Figure 6:
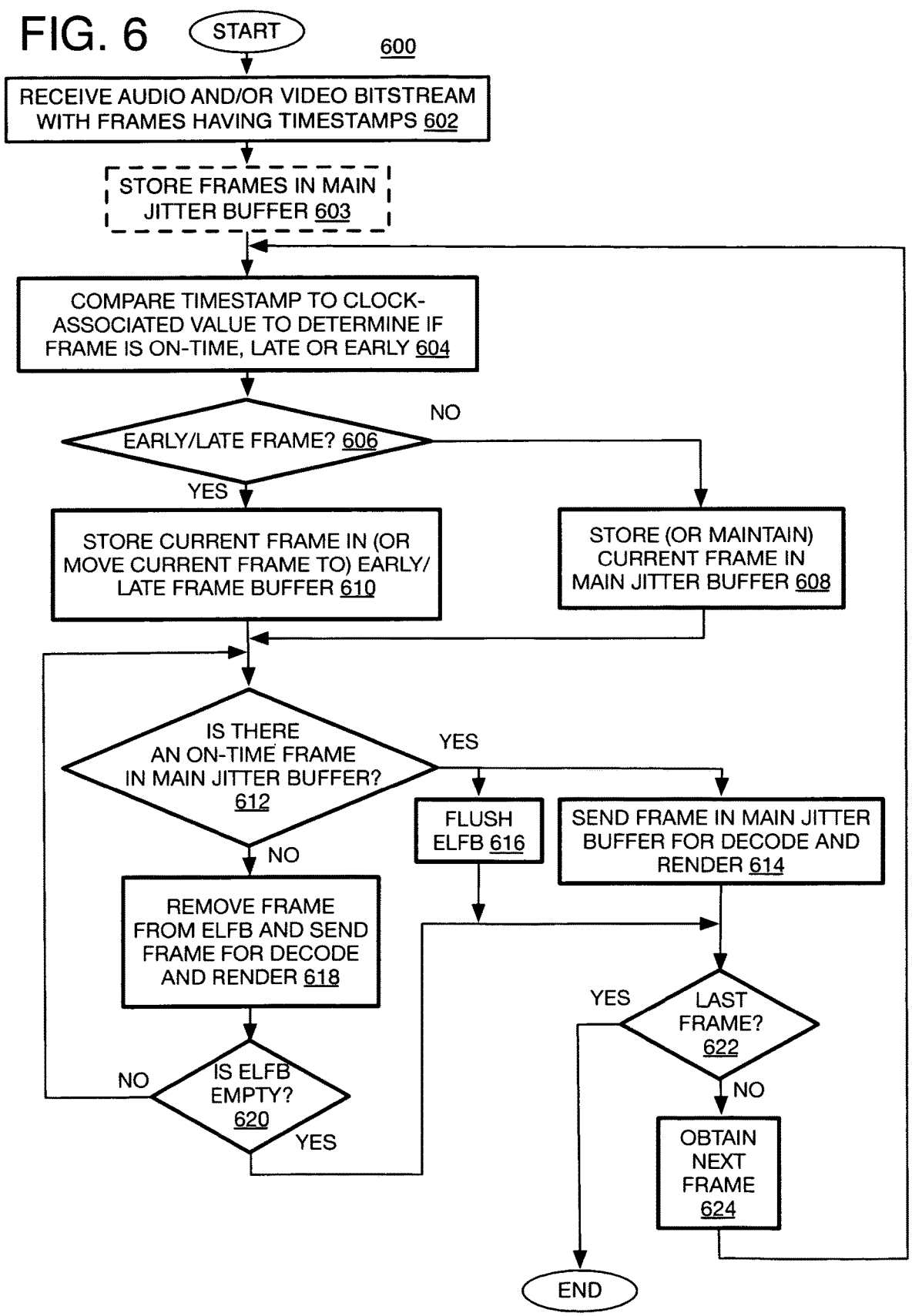
FIG. 6 is a detailed flow chart of a method of rendering late or early audio-video frames in accordance with the implementations herein.

Referring to FIG. 6, an example computer-implemented process 600 of rendering later or early audio-video frames is provided. In the illustrated implementation, process 600 may include one or more operations, functions or actions as illustrated by one or more of operations 602 to 624 numbered evenly. By way of non-limiting example, process 500 may be described with reference to example AV processing devices described herein with any of FIGS. 4, 7-8B, and 10-12, and where relevant.

Process 600 may include "receive audio and/or video bitstream with frames having timestamps" 602. Preliminarily, this may include a transmitter first receiving input AV sequence streaming from an external network such as the internet, or otherwise may obtain the AV sequence from memory on or accessible to the transmitter. A decoder on the transmitter may or may not be used to process the input AV sequence so that a viewer or audio player may be used to display and/or listen to the AV sequence on the transmitter while also transmitting a bitstream of the AV sequence to a receiver as described herein. In most conventional PAN systems, the audio will be muted on the transmitting device while emitting on the destination device. The audio and video of a frame are packed together along with the PTSs (explained below) by a multiplexer before the frames are then placed in a network transmitter stack and into a bitstream for transmission to a receiver. The transmission may be wireless.

This operation, however, more directly refers to receipt of the AV bitstream by the receiver (or sink or decoder). As described above, the input AV may be provided as frames that are encoded, and where individual frames, or the packets associated with a frame, are provided with a PTS extracted from the Multiplexed Transport Stream (MTS) of the AV packets or frames by one possible example. The PTSs provide the order and timing for the frames of audio and video. The PTSs may be set according to the encoder clock and to be matched to the decoder clock at the receiver.

It will be understood that this operation, as well as many of the others described below, may be operating continuously or as needed while the AV is being streamed from a source/transmitter device to the sink/receiver device and being played while the AV is being streamed. By one form, the transmitter and receiver are in the same room or otherwise in close proximity (whether or not in the same room) and are paired in a PAN or mirroring network as already described herein. Other arrangements may be used.

Process 600 may optionally include "store frames in main jitter buffer" 603, and this refers to one option of the order of operations to place the frames in buffers, such as the jitter buffers. The AV data transmitted from the transmitter and to the receiver may be de-multiplexed into separate sequences of audio and video packets associated with the frames. For this purpose, the main jitter buffer and early/late frame buffer actually may include sub-buffers with one sub-buffer for audio and one sub-buffer for video. In one optional case, the separated audio and video data are considered to cooperatively form a frame and have the same PTS. By another option, the PTS of the audio and video are kept separate and synchronized. Specifically, optimal values for AV synchronization are based on certain standards for example: (1) ITU BT.1359 is −30 ms +22.5 ms, (2) ATSC IS/191 is −45 ms +15 ms, (3) EBU R37 is −60 ms +40 ms to name a few examples, and where '−' indicates audio lagging video and '+' indicates audio leading video. The subjective limit where a person may notice sync loss is about −185 to +90. Once separated, the de-multiplexer may compare the PTS of the audio and/or video data to the decoder clock, and as mentioned, either a separate PTS for audio and video or a frame PTS that represents both an audio packet and a video packet.

By one option, all received frames of a sequence are stored in the main jitter buffer as the frames are received and extracted from the bitstream. The frames may preliminarily be stored in RAM on the receiver that is not considered the main jitter buffer, but thereafter each received frame is then placed in the main jitter buffer. Then, the system makes the comparison between the timestamp of a frame and a clock of the decoder. When it is determined that a frame is on-time, the frame remains in the main jitter buffer, but when it is determined that the frame is not on-time, the frame is removed from the main jitter buffer and placed in the early/late frame buffer in this case, and as explained further below. Note that this still can be performed with small buffers that hold relatively few frames, relatively speaking, since ideally the decoding and rendering are a continuous process so that large numbers of frames do not need to be held in the buffers at the same time.

By other options, the comparison is performed before the frames are placed in the buffers. In this case, the frames are first stored in RAM on the receiver that is not considered the buffers, as mentioned above, but now the de-multiplexer performs the comparison to decide whether each frame is early, on-time, or late to the decoder before placing the frame in either the main jitter buffer for the first time or the early/late frame buffer. As mentioned with system 400, the buffers may or may not be considered as part of the de-multiplexer in this case.

As to the comparison itself, process 600 may include "compare timestamp to clock-associated value to determine if frame is on-time, late, or early" 604. As described, the system determines whether the PTS of the frames (or audio and video packets separately) are within a certain margin (the clock-associated value) of a current value of the decoder clock (or other clock). The frames may be late due to internal delays during processing of the AV data at the transmitter or receiver whether by the computational load for processing the AV data itself or a slow down due to other applications at the transmitter or receiver monopolizing processor or other resources. Otherwise, transmission delays may be caused by network loads such as congested WiFi or wireless display (WiDi) networks, and so forth. Frames may be early due to non-uniform or late frames causing the frames to bunch up along the transmission pipeline resulting in some frames arriving early to a receiver.

The margin may be set by a number of known standards. By one form, the buffer margin is dependent on the jitter buffer size, and the point data is read from the buffer (the beginning, middle or end of the buffer). Thus, for example, if the buffer size is 50 ms and data is being read from the middle of the buffer, this margin would be less than or equal to +/−25 ms. Relevant here, when the PTS of the AV packets or frame is larger than the upper limit of the decoder clock margin, the frame is considered early. When the PTS of the AV packets are less than the low limit of the decoder clock margin, the frame is considered late.

Process 600 may include "early/late frame?" 606, and once it is determined whether the frame is on-time, late or early, the frame may be placed in the appropriate buffer as follows.

Process 600 may include "store (or maintain) current frame in main jitter buffer" 608, and particularly, the system places on-time frames in the main jitter buffer when those frames are not already in the main jitter buffer. Alternatively for the option where all frames are placed in the main jitter buffer, these frames are maintained in the main jitter until provided (or retrieved) for decoding and render.

Figure 7:
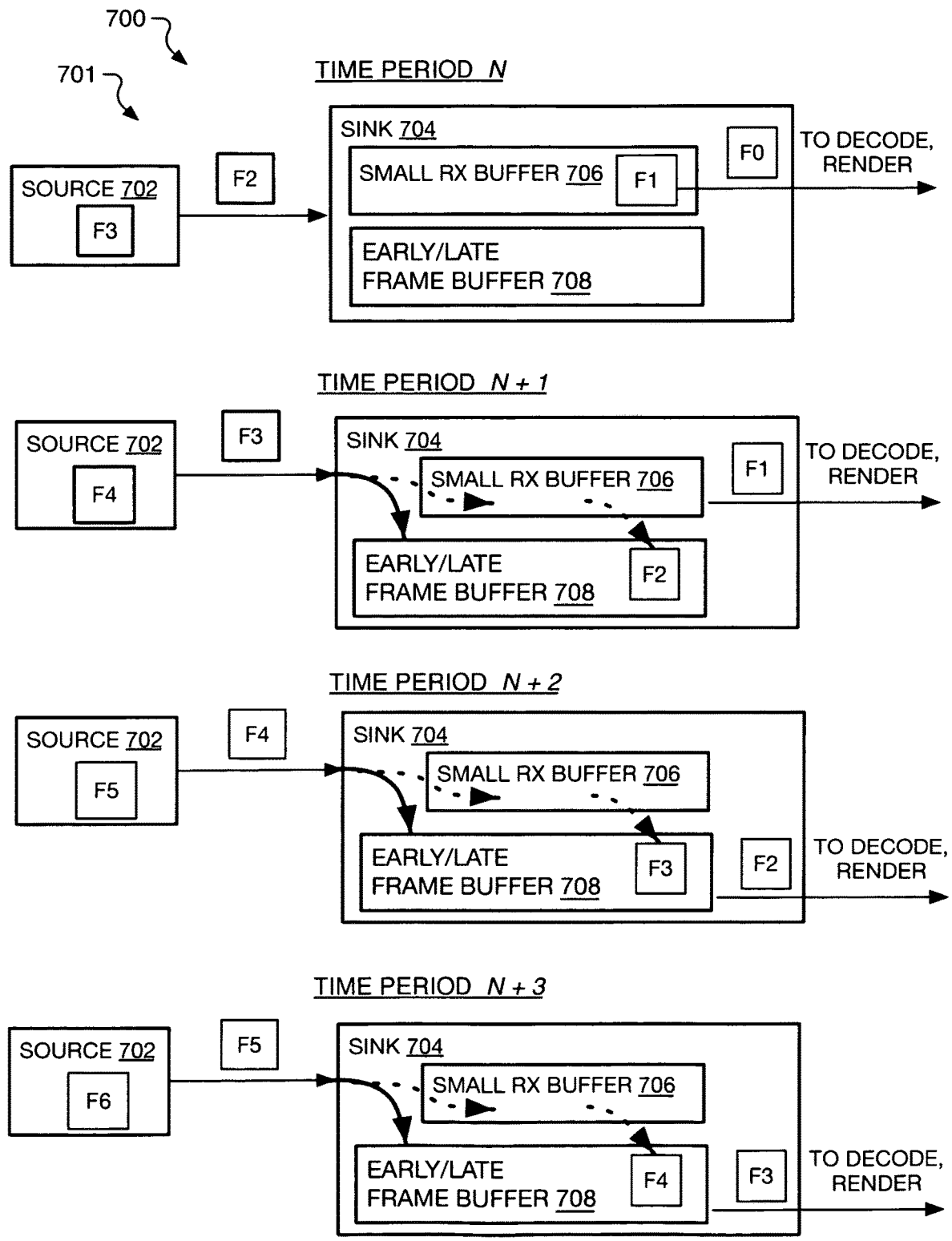
FIG. 7 is a schematic diagram showing a series of operations of an AV processing system performing a method of rendering late or early audio-video frames in accordance with the implementations herein.

Referring to FIG. 7, an example sequence 700 of operations of an AV processing system 701 is shown with a source (or transmitter) 702 playing (or at last processing) and transmitting AV to a sink (or receiver). Frame F1 at time period N is an on-time frame and was just placed in main jitter buffer 706. A frame F2 is being transmitted and the comparison for this frame has not been made yet, and frame F3 is still being processed at the source. On-time frame F0 has been removed from the main jitter buffer 706 and is being provided for decoding and rendering. The other operations are explained below.

The buffers may only hold 1 to 5 frames by one example. The size of the buffers may be determined by trial and error balancing memory capacity with efficiency as well as the other factors mentioned above such as latency and AV quality. Also, the buffers may be set to vary in size and could be controlled using real-time transport protocol (RTP) control protocol (RTCP) messages which is a public standard from the Internet Engineering Task Force (IETF). See, RTP Control Protocol (RTCP) Extended Report (XR) Block for De-Jitter Buffer Metric Reporting details, section 1.1. The format used may be SDP (Session Descriptor Protocol) in RTCP messaging. This standard includes instructions to provide a packet for transmission to a receiver which may be used to control the de-jitter size. This is performed by configuring the jitter buffer nominal delay (JB nominal), jitter buffer maximum delay (JB maximum), and jitter buffer absolute maximum delay (JB abs max) parameters in the RTCP messaging from the transmitter to the receiver. The size of the buffer may be controlled only at the sink or may include transmitted instruction from a source to a sink to control the jitter buffer size at the sink. Other protocols may be used as well.

Process 600 may include "store current frame in (or move current frame to) early/late frame buffer" 610. As mentioned then, those frames determined to be early or late may be moved to the early/late frame buffer from the main jitter buffer when the system places all frames in the main jitter buffer at first. Otherwise, the system places the early or late frames in the early/late frame buffer from other places in memory such as RAM memory not designated one of the jitter buffers being used. It also will be understood that early and late frames each could have their own buffer (a late frame buffer and an early frame buffer) but such division is not necessary for the methods to work. It also will be understood that the two or more buffers described may be separate buffers located on the same memory or different memories or may be spread over two or more memories. Otherwise, the first buffer (the main jitter buffer) and the second buffer (the early/late frame buffer) may be considered portions of, and referred to as, the same single buffer whether or not on a single memory or spread over a number of memories, and where movement of frames into or out of one portion versus the other portion is considered different. Many variations exist.

Figure 8A:
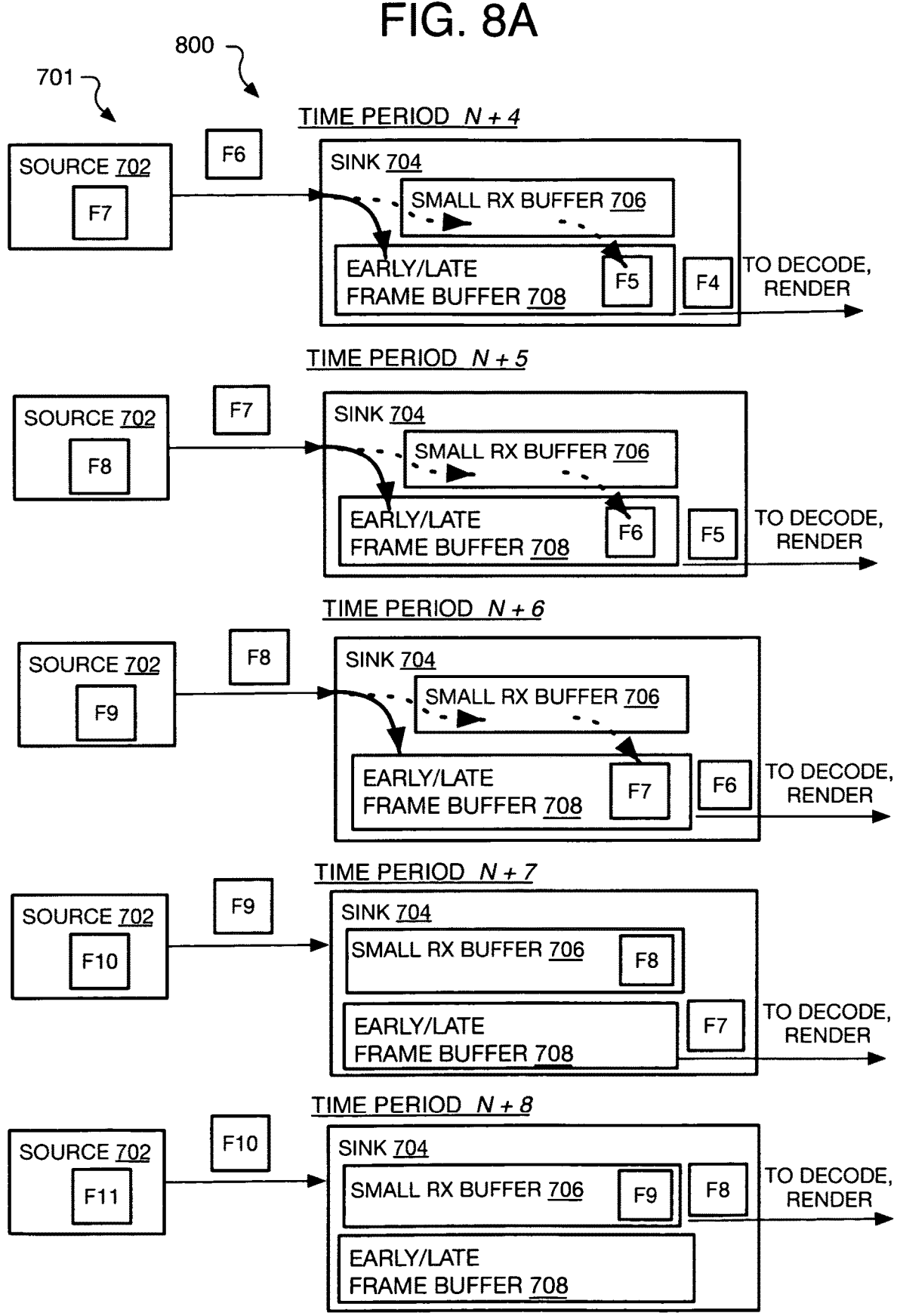
FIG. 8A is a schematic diagram continuing the series of operations of FIG. 7 frames in accordance with the implementations herein.

Referring to FIG. 8A, sequence 800 is a continuation of sequence 700, and time periods N+1 to N+6 show late (or early) frames F2 to F7 were placed in the early/late frame buffer 708 rather than the main jitter buffer 706, and rather than being discarded as shown on FIG. 3. Also as shown, this may be from a determination before placing the frames in any buffer (as shown by the solid line) or by moving the frames from the main jitter buffer 706 to the early/late frame buffer 708 (as shown by the dashed lines).

The intermediate period (between time period N and N+1) where the main jitter buffer 706 is empty (the late frame should have been there if on-time) is not shown because it is possible that even though a frame is late or early and placed in the early/late frame buffer 708, the frame still may be displayed in time with the present method so that a user does not notice the short pause for a single frame for example.

Process 600 may include "is there an on-time frame in main jitter buffer" 612. In more detail, process 600 includes a loop to monitor the main jitter buffer to detect when an on-time frame resides in the main jitter buffer. This may detect those claims inputted to the buffer, being maintained in the buffer for a certain period for example, or being outputted from the buffer and provided to a decoder for example.

Process 600 may include "send frame in main jitter buffer for decode and render" 614. Thus, when it is determined an on-time frame is in the main jitter buffer, it is sent to the decoder, and subsequently rendered for example. Continuing the example of system 701, on-time frame F0 at time period N was provided from the main jitter buffer 706 and will be provided to a decoder. Likewise, frame F1 at the main jitter buffer 706 at time period N will be retrieved or provided from the main jitter buffer and to a decoder.

Otherwise, when it is determined that no on-time frames exist in the main jitter buffer, but there are early or late frames in the early/late frame buffer, process 600 may include "remove frame from ELFB and send frame for decode and render" 618. Continuing the example again, the sequences 700 and 800 cooperatively show a run of late or early frames F2 to F7 being removed from the early/late frame buffer 708 at time periods N+2 to N+7. The frames are then provided to a decoder and may be rendered thereafter. Storing and using a sequence of late frames like this may avoid the long pauses that would have been created otherwise since the frames are sufficiently close to being on-time for viewing by a user when provided by the early/late frame buffer.

Process 600 may include "is ELFB empty" 620, and once a frame is provided from the early/late frame buffer, it is checked to determine whether any more frames are still in the early/late frame buffer. If so, the process loops back to operation 612 to check whether any on-time frames exist in the main jitter buffer. If no on-time frames are present in the main jitter buffer at that point, then the process 600 continues the loop and repeats operation 618 to remove the next frame from the early/late frame buffer and provide the frame for decoding and rendering. The early/late frame buffer is then checked again and the loop continues.

When one or more on-time frames are present in the main jitter buffer, the on-time frame is provided for decoding and rendering under operation 614 as explained above. Thus as shown in sequence 800 (FIG. 8A) at time period N+7, once an on-time frame arrives (here F8), it is placed in the main jitter buffer. From that point forward, when the frames are on-time, the on-time frame F8 is provided from the main jitter buffer 706 for decoding and rendering and new on-time frame F9 is placed (or maintained) in the main jitter buffer 706 as shown in time period N+8.

Simultaneously, or at least around the same time, that an on-time frame is detected in the main jitter buffer, process 600 may include "flush ELFB" 616. Thus, in one form, if a new on-time frame arrives (or is otherwise detected) at the main jitter buffer, or could otherwise be detected anywhere else available for a decoder, and at any point before providing an early or late frame for decoding and rendering from the early/late frame buffer, the early/late frame buffer then may be flushed (or emptied), and the early/late frames in the early/late frame buffer are discarded. By one form, all frames in the buffered are flushed, but less than all frames could be flushed as well to save some just in case of an error while the on-time frame is being processed for example.

Figure 8B:
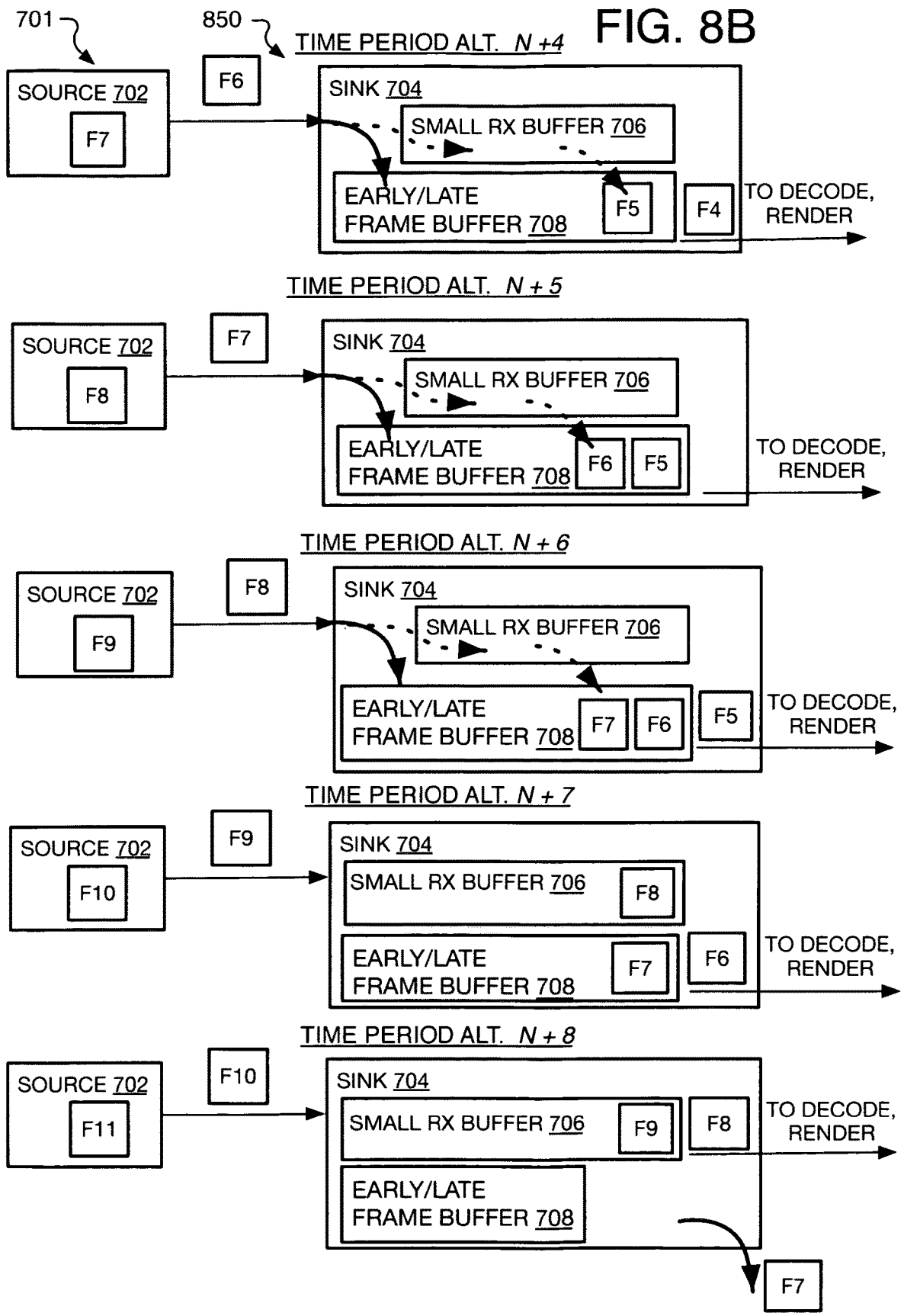
FIG. 8B is a schematic diagram continuing the series of operations of FIG. 7 with alternative operations in accordance with the implementations herein.

Referring to FIGS. 7 and 8B to show an example of resuming buffering of on-time frames and flushing the early/late frame buffer, sequence 850 is an alternative sequence to that of sequence 800 and is a continuation of sequence 700. In this example, a run of late (or early) frames F2 to F6 were placed in the early/late frame buffer and were (or will be) removed from the late frame buffer for decoding and rendering. Assuming for this example that a delay occurred and the early/late frame buffer can hold at least two frames, here the early/late frame buffer 708 is holding late or early frames F5 and F6 in time period N+5 while late frame F7 is being transmitted to the sink. In the next time period N+6, frame F7 is placed in the early/late frame buffer 708 while a new on-time frame F8 is being transmitted to start a run of on-time frames. Frame F5 is removed or provided from the early/late frame buffer 708 and for decoding and rendering.

During the next time period N+7, late (or early) frame F7 is maintained in the early/late frame buffer 708, while on-time frame F8 is first placed in the main jitter buffer 706, and frame F6 is provided from the early/late frame buffer 708 for decoding and rendering. Also, new on-time frame F9 is being transmitted to the sink 704 during this time period. Finally, frame F8 is now provided from the main jitter buffer 706 while late (or early frame) F7 is flushed or discarded from the early/late frame buffer 708 in time period N+8. On-time frame F9 is then placed in the main jitter buffer while on-time frame F10 is being transmitted to the sink 704. By one form, this operation is performed only when an on-time frame arrives at the sink. This would continue for F9 and F10 until another late frame or sequence of late frames arrives.

Returning to operation 620, once it is determined that the early/late frame buffer is empty, or after an on-time frame is provided from the main jitter buffer, whether or not the early/late frame buffer was flushed, the process 600 then may include "last frame?" 622, to determine if the process has reached the end of the frame sequence. If so, the process has ended, and other applications continue such as decoding, rendering, and so forth, or the system waits for a new frame sequence.

Otherwise, if there are more frames to analyze in the frame sequence, the process 600 may then "obtain next frame" 624, and then loops back to either operation 603, to store the frame in the main jitter buffer when done so before the comparison, or directly to operation 604 to compare the timestamp to the clock to determine the timeliness of the frame and in which buffer to first place (or maintain) the frame in.

The process 600 may loop as described until the end of an AV sequence has been transmitted by the transmitter and/or rendered by the receiver. The process 600 may always be on. Otherwise, in order to save on processing power, the process 600 may be set to run at regular intervals rather than continuously, or may be activated based on certain triggers such as a sequence size or detection of a request for a relatively large computational load.

It will be appreciated that while the implementations discussed herein are applied to compressed AV data transmitted between an encoder and a decoder, the implementations described herein directed to transmission of frames into multiple buffers by the methods described additionally or alternatively could be applied to non-compressed data as well. Thus, an encoder could be transmitting non-compressed data to a decoder, or the decoder also may be one example of a time-ordered frame processing unit that can receive non-compressed frames from the buffers and that may apply other processing, such as image enhancements and refinement, that is not decompression.

Figure 9:
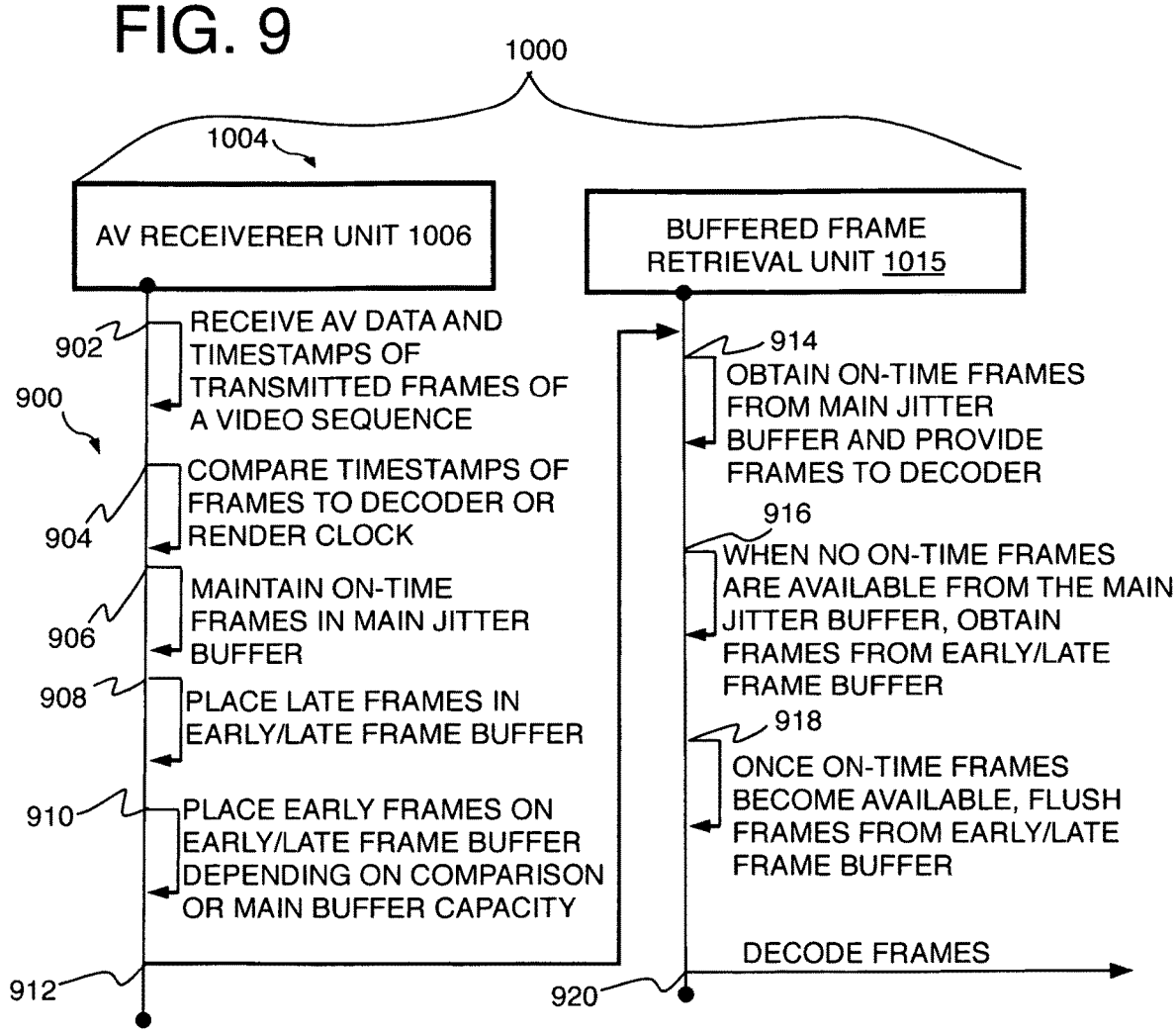
FIG. 9 is an illustrative diagram of an AV processing system in operation and performing a method of rendering late or early audio-video frames in accordance with the implementations herein.

Referring to FIG. 9, by another approach, process 900 illustrates the operation of an AV processing system 1000 that performs rendering of late or early audio-video frames in accordance with at least some implementations of the present disclosure. In more detail, in the illustrated form, process 900 may include one or more operations, functions or actions as illustrated by one or more of actions 902 to 918 numbered evenly. By way of non-limiting example, process 900 will be described herein with reference to FIGS. 4, 10 and 11. Relevant here, system 1000 includes logic units 1004 including an AV receiver unit 1006 with a bitstream receiver/de-multiplexer unit 1010 that has a timestamp comparison unit 1012 to compare frame timestamps to a decoder or other clock, and a buffer selection unit 1014 that places (or maintains) frames in a main jitter buffer 1026 or early/late frame buffer (ELFB) 1027 depending on the results of the comparison. A buffered frame retrieval unit 1015 may be provided to retrieve frames from the buffers and empty the ELFB as needed. The operation of the system 1000 may proceed as follows.

Process 900 may include "receive AV data and timestamps of transmitted frames of a video sequence" 902, and particularly, receiving the encoded AV signals (which may be provided as frames or packets that form frames) as well as the timestamps, such as PTSs of the frames (or packets). The frames may be placed in a memory such as RAM, which may or may not be a main jitter buffer as explained above.

The process 900 then may include "compare timestamps of frames to decoder or render clock" 904, and by one specific example, the value of the timestamp of a frame (or video or audio packet) is compared to a margin value of a decoder or renderer clock for example. When the timestamp is equal to or within the margin, the frame is on-time. When the timestamp is less than a low margin value, the frame is late. When the timestamp is greater than a high margin value, the frame is early. The details are provided above.

The process 900 may include "maintain on-time frames in main jitter buffer" 906. On-time frames that were already placed in the main jitter buffer are maintained in the main jitter buffer to be provided to a decoder when requested or retrieved. Alternatively, as explained before, a de-multiplexer for example may determine the timeliness of a frame before placing the frame in any jitter buffer, and therefore, may first place an on-time frame in the main jitter buffer not until after determining the frame's timeliness.

The process 900 then may include "place late frames in early/late frame buffer" 908, where the frames determined to be late are either removed from the main jitter buffer and placed in the early/late frame buffer, or the late frames are first placed in the early/late frame buffer after the comparison of timestamp and clock margin as explained above.

The process 900 may include "place early frames in early/late frame buffer depending on comparison or main buffer capacity" 910. Similar operation applies here as with the placement of the late frames in the early/late frame buffer and the timestamp to clock margin comparison, except here, it also will be understood that frames that arrive when no capacity exists in the main jitter buffer may be assumed to be early frames. These early frames may be placed in the early/late frame buffer without performing the comparison.

The process 900 may include providing 912 the buffered frames to a buffered frame retrieval unit 1015, or otherwise providing access to the frames for decoding and rendering. Thus, the process 900 then may include "obtain on-time frames from main jitter buffer and provide frames to decoder" 914. As described above, to provide the on-time frames from the main jitter buffer for decoding and subsequent use.

The process 900 may include "when no on-time frames are available from the main jitter buffer, obtain frames from early/late frame buffer" 916. This operation includes providing the late and/or early frames from the early/late frame buffer as long as no on-time frame exists in the main jitter buffer at all. Alternatively, this may providing early or late frames from the early/late frame buffer as long as no on-time frame is detected at a certain stage in the main jitter buffer, such as when received in the main jitter buffer, maintained for a certain period in the main jitter buffer, or when outputted from the main jitter buffer and/or held in the main jitter buffer for a certain purpose, such as decoding for example. Once an on-time frame is detected in the main jitter buffer, the operation proceeds to decoding as with operation 906.

The process 900 may include "once on-time frames become available, flush frames from early/late frame buffer" 918. Thus, simultaneously with, or around the time of, providing on-time frames from the main jitter buffer for decoding, and rendering if performed, the early/late frames are flushed or emptied from the early/late frame buffer. The flushing may occur at other convenient times rather than during the time of providing the on-time frame from the main jitter buffer. The flushed frames are discarded.

The process 900 then may include "decode frames" 920, such that the decoder and/or buffered frame retrieval unit may have the frames obtained from the main jitter buffer when the timestamp of a frame matches the clock (or is at least within a margin of the clock), or when there are early or late frames, obtained from the early/late frame buffer as just explained. These frames are then decoded to their uncompressed form and may be provided to another application that will use the AV data to render the AV whether emitting audio through speakers for example, displaying video images on a screen, storing the uncompressed images for later viewing or other uses, or any combination of these.

It will be appreciated that processes 500, 600, and/or 900 may be provided by sample AV processing systems 400, 1000, 1100, and/or 1200 to operate at least some implementations of the present disclosure. In addition, any one or more of the operations of FIGS. 5, 6, and 9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
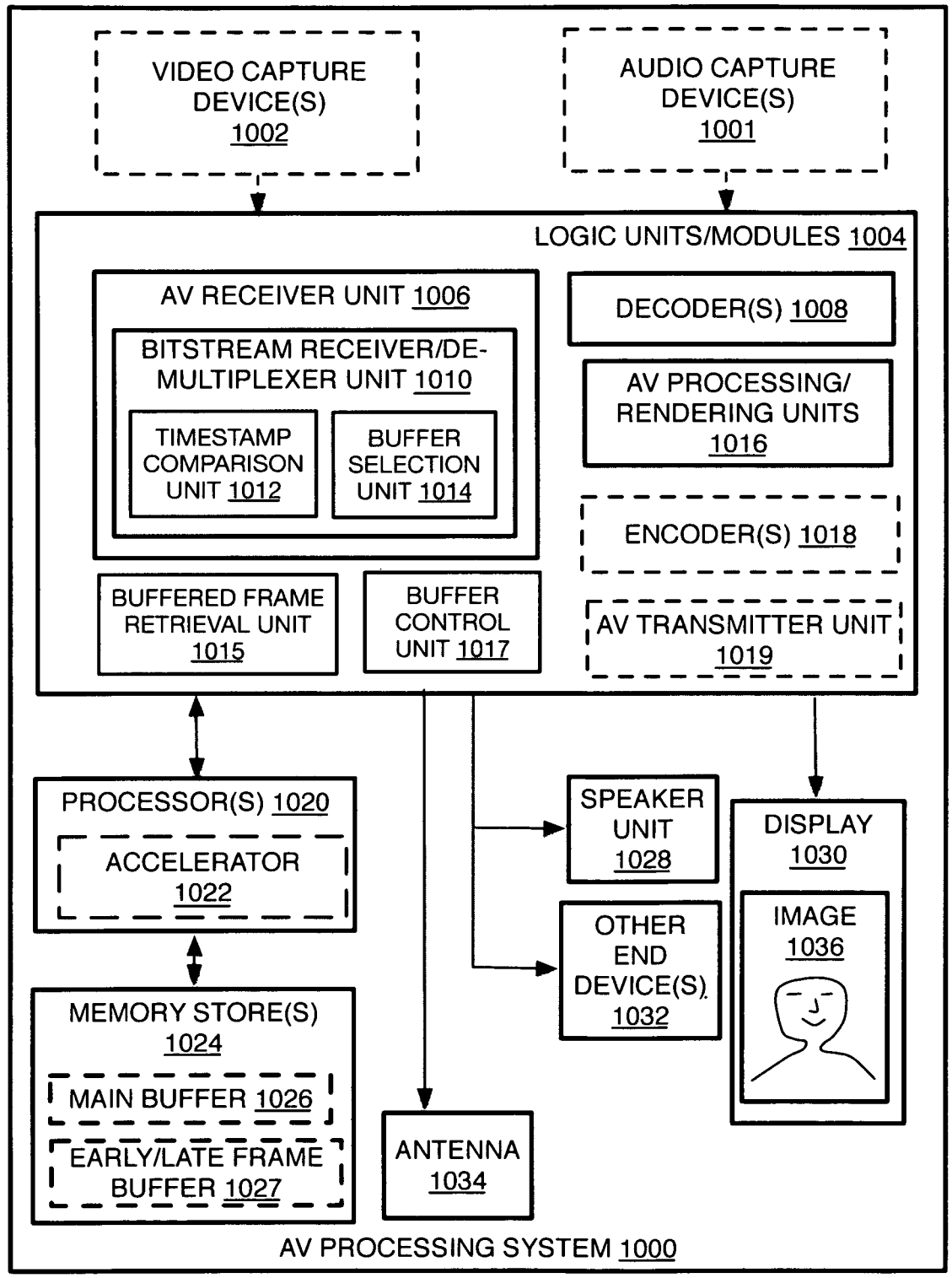
FIG. 10 is an illustrative diagram of an example system.

Referring to FIG. 10, an example AV processing system 1000 is arranged in accordance with at least some implementations of the present disclosure. The system 1000 may be a receiver described in detail herein. The receiver 1000 also may be referred to as a decoder or AV providing device such as a speaker or image display device (television, computer, smartphone, tablet, and so forth).

In various implementations, the example AV processing system or receiver 1000 may have a video capture device(s) 1002 and an audio capture device(s) 1003 so that the receiver can act as a transmitter to form or receive AV data if desired. This can be implemented in various ways. Thus, in one form, the AV processing system 1000 is a device, or is on a device, with a number of microphones or cameras. In other examples, the AV processing system 1000 may be in communication with one or a network of microphones or cameras, and may be remote from these devices such that logic modules 1004 may communicate remotely with, or otherwise may be communicatively coupled to, the microphones and/or cameras for further processing of the captured audio and/or video data.

The system 1000 may have one or more video capture or imaging devices 1002 such as cameras for capturing images either alone or along with capturing audio. Such technology may include a camera such as a digital camera system, a dedicated camera device, or an imaging phone or tablet, camera that provides a preview screen, or some combination of these. Thus, in one form, imaging device 1002 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1002 may be provided with an eye tracking camera.

As to the audio, such technology not already mentioned above also may include a dictation machine or other sound or video and audio recording machine, a mobile device, or an on-board device, or any combination of these. Thus, in one form, audio capture device 1003 may include audio capture hardware including one or more sensors as well as actuator controls. These controls may be part of a sensor module or component for operating the sensor. The sensor component may be part of the audio capture device 1003, or may be part of the logical modules 1004 or both. Such sensor component can be used to convert sound waves into an electrical acoustic signal. The audio capture device 1003 also may have an A/D converter, other filters, and so forth to provide a digital signal for acoustic signal processing.

In the illustrated example, the system or receiver 1000 may have logic units or modules 1004 that has an AV receiver unit 1006 and a decoder 1008. The AV receiver unit 1006 has a bitstream receiver/de-multiplexer unit 1010 that receives a transmitted bitstream of AV data over antenna 1034 for example, and de-multiplexes the data into separate audio and video frames with audio and video packets respectively. The de-multiplexer unit 1010 has a timestamp comparison unit 1012 and a buffer selection unit 1014 that provides many of the functions mentioned herein including the placement of frames in a main buffer 1026 or early/late frame buffer 1027 as explained above. The logic modules 1004 also may include a buffered frame retrieval unit 1015 that provides the frames from the buffers and to the decoder 1008, and eventually obtained by an AV processing and rendering unit 1016 that emits audio signals from speaker unit 1028 for example, and may display video on display 1030. A buffer control unit 1017 controls the parameters of the buffers 1026 and 1027 as described herein. The logic modules 1004 also may include an encoder 1018 and an AV transmitter unit 1019 to be used when the receiver acts as a transmitter instead. The buffers 1026 and 1027 may be located at memory 1024 and may be jitter (or de jitter) buffers that stores at least AV frames as described above.

The system 1000 may have one or more processors 1020 which may include a dedicated accelerator 1022 such as the Intel Atom, memory stores 1024 as mentioned and which may or may not hold the time stamps, at least one speaker unit 1028 to emit audio when desired, one or more displays 1030 to provide images 1036 when desired, any other end device(s) 1032, and antenna 1034 as already mentioned above. In one example implementation, the image processing system 1000 may have the at least one processor 1020 communicatively coupled to the Av receiver unit 1006, buffered frame retrieval unit, and at least one memory 1024. The antenna 1034 also may be provided to transmit other commands to a paired device or other devices. As illustrated, any of these components may be capable of communication with one another and/or communication with portions of logic modules 1004. Thus, processors 1020 may be communicatively coupled to the antenna 1034, the logic modules 1004, and the memory 1024 for operating those components.

Although the receiver 1000, as shown in FIG. 10, may include one particular set of blocks or actions associated with particular components or modules, these blocks or actions may be associated with different components or modules than the particular component or module illustrated here.

Figure 11:
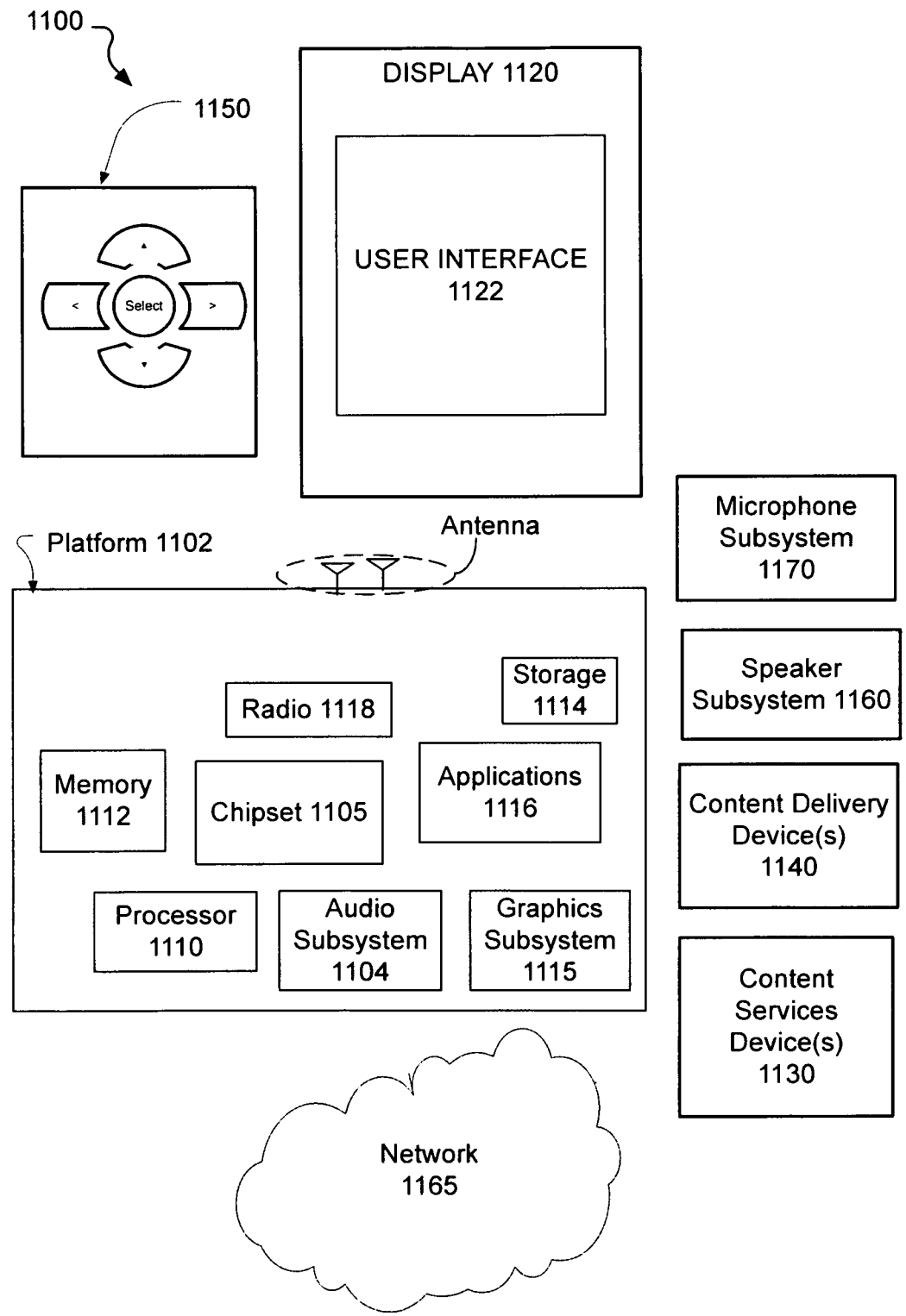
FIG. 11 is an illustrative diagram of another example system.

Referring to FIG. 11, an example system 1100 in accordance with the present disclosure operates one or more aspects of the audio processing system described herein and may be either a transmitter (source) or receiver (sink) as described herein. It will be understood from the nature of the system components described below that such components may be associated with, or used to operate, certain part or parts of the audio processing system described above. In various implementations, system 1100 may be a media system although system 1100 is not limited to this context. For example, system 1100 may be incorporated into one or more microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having an acoustic signal analyzing device, and often a display device as well.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102, speaker subsystem 1160, microphone subsystem 1170, and/or display 1120. Each of these components is described in greater detail below.

In various implementations, platform 1102 may include any combination of a chipset 1105, processor 1110, memory 1112, storage 1114, audio subsystem 1104, graphics subsystem 1115, applications 1116 and/or radio 1118. Chipset 1105 may provide intercommunication among processor 1110, memory 1112, storage 1114, audio subsystem 1104, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Audio subsystem 1104 may perform processing of audio. The audio subsystem 1104 may comprise one or more processing units, memories, and accelerators. Such an audio subsystem may be integrated into processor 1110 or chipset 1105. In some implementations, the audio subsystem 1104 may be a stand-alone card communicatively coupled to chipset 1105. An interface may be used to communicatively couple the audio subsystem 1104 to a speaker subsystem 1160, microphone subsystem 1170, and/or display 1120.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), wireless display (WiDis) to establish Pan or mirroring networks, cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120, speaker subsystem 1160, and microphone subsystem 1170. Platform 1102 and/or content services device(s) 1130 may be coupled to a network 1165 to communicate (e.g., send and/or receive) media information to and from network 1165. Content delivery device(s) 1140 also may be coupled to platform 1102, speaker subsystem 1160, microphone subsystem 1170, and/or to display 1120.

In various implementations, content services device(s) 1130 may include a network of microphones, a cable television box, personal computer, network, telephone, Internet enabled devices or appliance capable of delivering digital information and/or content, and any other similar device capable of unidirectionally or bidirectionally communicating content between content providers and platform 1102 and speaker subsystem 1160, microphone subsystem 1170, and/or display 1120, via network 1165 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1104 also may be used to control the motion of articles or selection of commands on the interface 1122.

Movements of the navigation features of controller 1150 may be replicated on a display (e.g., display 1120) by movements of a pointer, cursor, focus ring, or other visual indicators displayed on the display or by audio commands. For example, under the control of software applications 1116, the navigation features located on navigation controller 1150 may be mapped to virtual navigation features displayed on user interface 1122, for example. In implementations, controller 1150 may not be a separate component but may be integrated into platform 1102, speaker subsystem 1160, microphone subsystem 1170, and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example, or by auditory command. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102, speaker subsystem 1160, microphone subsystem 1170, and/or display 1120 may be an integrated unit. Display 1120, speaker subsystem 1160, and/or microphone subsystem 1170 and content service device(s) 1130 may be integrated, or display 1120, speaker subsystem 1160, and/or microphone subsystem 1170 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
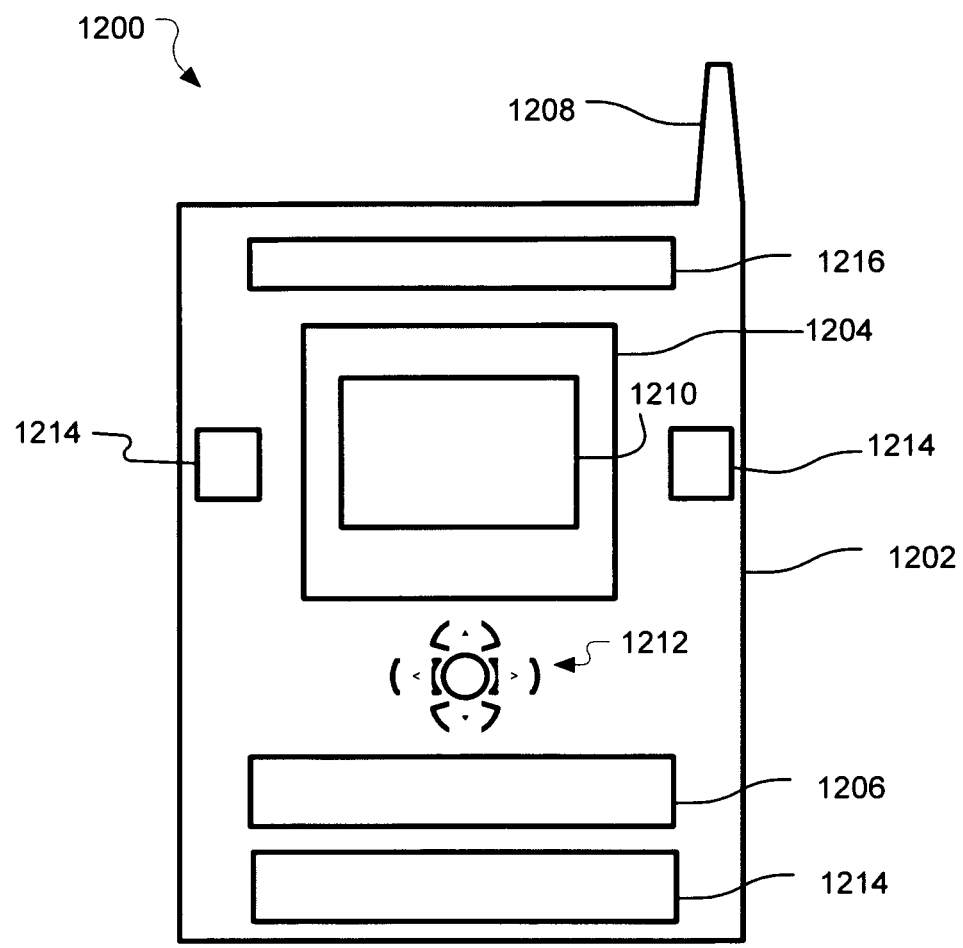
FIG. 12 illustrates another example device, all arranged in accordance with at least some implementations of the present disclosure.

Referring to FIG. 12, a small form factor device 1200 is one example of the varying physical styles or form factors in which system 400, 900, 1000, or 1100 may be embodied. By this approach, device 1200 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, and/or microphone system or network.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204 including a screen 1210, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, software and so forth. Information also may be entered into device 1200 by way of one or more microphones 1214. Such information may be processed by an audio transmitter or source as described herein and as part of the device 1200, and may provide audio via a speaker 1216 or visual responses via screen 1210. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer-implemented method of rendering early or late frames comprising: receiving frames of a frame sequence having audio data, video data, or both; providing one or more frames of the sequence from a first buffer accessible to a time-ordered frame processing unit, and wherein individual frames of the one or more frames from the first buffer have a timestamp that meets a criteria associated with a clock associated with the time-ordered frame processing unit; and providing one or more frames of the sequence from a second buffer and those frames of the sequence with a timestamp that do not meet the criteria.

The method also may comprise providing the one or more frames from the second buffer when no frame meeting the criteria is available from the first buffer and to process the frames by the time-ordered frame processing unit; discarding one or more frames in the second buffer when an on-time frame that meets the criteria is placed in the first buffer; determining whether the timestamp is within a margin of the clock value as the criteria; placing at least one early frame in the second buffer when no capacity exists in the first buffer for the early frame regardless of timestamp value; at least one of: determining which of the first and second buffers to place a frame of the sequence before placing the frame in the first or second buffers, and placing frames of the sequence in the first buffer before determining whether a frame does not meet the criteria and should be moved to the second buffer; and providing frames from additional buffers so that the second buffer provides late frames while a third buffer provides early frames; wherein the capacity of both the first and second buffers is 1 to 6 frames; wherein both the first and second buffers have sub-buffers where one sub-buffer holds video data for frames and another sub-buffer holds audio data for frames; wherein the first and second buffers are parts of a single buffer; and wherein the time-ordered frame processing unit is a decoder and the received frames are compressed frames.

By another implementation, a system to render early or late frames of a sequence of frames comprising: at least one memory; at least one display; at least one processor communicatively connected to the at least one memory and at least one display; a receiver unit operated by the at least one processor and arranged to receive frames of a sequence of audio data, video data, or both; and a buffered frame retrieval unit operated by the at least one processor and arranged to: provide one or more frames of the sequence from a first buffer accessible to a time-ordered frame processing unit, and wherein individual frames of the one or more frames from the first buffer have a timestamp that meets a criteria associated with a clock associated with the time-ordered frame processing unit; and provide one or more frames of the sequence from a second buffer and those frames of the sequence with a timestamp that do not meet the criteria.

The system also may comprise wherein the buffered frame retrieval unit is arranged to: provide the one or more frames from the second buffer when no frame meeting the criteria is available from the first buffer and to process the frames by the time-ordered frame processing unit; discard one or more frames in the second buffer when an on-time frame that meets the criteria is placed in the first buffer; and provide frames from additional buffers so that the second buffer provides late frames while a third buffer provides early frames; the system comprising a buffering decision unit arranged to: determine whether the timestamp is within a margin of the clock value as the criteria; place, at least one early frame in the second buffer when no capacity exists in the first buffer for the early frame regardless of timestamp value; and at least one of: determine which of the first and second buffers to place a frame of the sequence before placing the frame in the first or second buffers, and place frames of the sequence in the first buffer before determining whether a frame does not meet the criteria and should be moved to the second buffer; and wherein the capacity of both the first and second buffers is 1 to 6 frames; wherein both the first and second buffers have sub-buffers where one sub-buffer holds video data for frames and another sub-buffer holds audio data for frames; wherein the first and second buffers are parts of a single buffer; and wherein the time-ordered frame processing unit is a decoder and the received frames are compressed frames.

By another example, at least one computer readable medium comprising instructions that in response to being executed on a computing device, causes the computing device to: receive frames of a sequence of audio data, video data, or both; provide one or more frames of the sequence from a first buffer accessible to a time-ordered frame processing unit, and wherein individual frames of the one or more frames from the first buffer have a timestamp that meets a criteria associated with a clock associated with the time-ordered frame processing unit; and provide one or more frames of the sequence from a second buffer and those frames of the sequence with a timestamp that do not meet the criteria.

The instructions also may cause the computing device to: provide the one or more frames from the second buffer when no frame meeting the criteria is available from the first buffer and to process the frames by the time-ordered frame processing unit; discard one or more frames in the second buffer when an on-time frame that meets the criteria is placed in the first buffer; determine whether the timestamp is within a margin of the clock value as the criteria; place at least one early frame in the second buffer when no capacity exists in the first buffer for the early frame regardless of timestamp value; at least one of: determine which of the first and second buffers to place a frame of the sequence before placing the frame in the first or second buffers, and place frames of the sequence in the first buffer before determining whether a frame does not meet the criteria and should be moved to the second buffer; and provide frames from additional buffers so that the second buffer provides late frames while a third buffer provides early frames; wherein the capacity of both the first and second buffers is 1 to 6 frames; wherein both the first and second buffers have sub-buffers where one sub-buffer holds video data for frames and another sub-buffer holds audio data for frames; wherein the first and second buffers are parts of a single buffer; and wherein the time-ordered frame processing unit is a decoder and the received frames are compressed frames.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of rendering early or late frames comprising:
   receiving compressed frames of a frame sequence having audio data, video data, or both;
   placing compressed frames of the frame sequence in a first buffer accessible to a time-ordered frame processing unit and accessible by a decoder;
   determining whether or not frames already in the first buffer have a stamp that meets a criteria associated with a clock associated with the time-ordered frame processing unit and wherein the criteria indicates whether or not the frames are on-time;
   moving compressed frames from the first buffer into the second buffer that do not meet the criteria so that the second buffer only holds late or early frames that are not on-time while maintaining frames in the first buffer that do meet the criteria and comprising discarding one or more frames in the second buffer that do not meet the criteria when an on-time frame that meets the criteria laced in the first buffer;
   providing, by at least one processor, one or more frames of the sequence from the first buffer and to a decoder;
   providing, by at least one processor, one or more frames of the sequence from the second buffer and those frames of the sequence with a timestamp that do not meet the criteria, and provided to the decoder;
   decoding frames from the first buffer and second buffer to be rendered; and
   rendering the decoded frames at an audio speaker or video display.

2. The method of claim 1 comprising providing the one or more frames from the second buffer when no frame meeting the criteria is available from the first buffer and to process the frames by the time-ordered frame processing unit.

3. The method of claim 1 comprising determining whether the timestamp for a frame is within a margin of a clock value as the criteria after the frame is placed in the first buffer.

4. the method of claim 1 wherein the first buffer has the capacity for multiple entire frames, and the method comprising placing at least one early frame in the second buffer when no space exists in the first buffer because the first buffer is full.

5. The method of claim 1 wherein the capacity of both the first and second buffers is 1 to 5 frames.

6. The method of claim 1 comprising providing frames from additional buffers so that three buffers exist at the same time and wherein the second buffer provides only late frames while a third buffer provides only early frames.

7. The method of claim 1 wherein both the first and second buffers have sub-buffers where one sub-buffer holds video data for frames and another sub-buffer holds audio data for frames.

8. The method of claim 1 wherein the first and second buffers are parts of a single buffer.

9. The method of claim 1 wherein the time-ordered frame processing unit is part of the decoder and the received frames are compressed frames.

10. The method of claim 1 comprising: providing the one or more frames from the second buffer when no frame meeting the criteria is available from the first buffer and to process the frames by the time-ordered frame processing unit;

discarding one or more frames in the second buffer when an on-time frame that meets the criteria is placed in the first buffer;

determining whether the timestamp is within a margin of the clock value as the criteria; placing at least one early frame in the second buffer when no capacity exists in the first buffer for the early frame regardless of timestamp value;

providing frames from additional buffers so that the second buffer provides late frames while a third buffer provides early frames;

wherein the capacity of both the first and second buffers is 1 to 6 frames; wherein both the first and second buffers have sub-buffers where one sub-buffer holds video data for frames and another sub-buffer holds audio data for frames; wherein the first and second buffers are parts of a single buffer; and wherein the time-ordered frame processing unit is part of the decoder and the received frames are compressed frames.

11. At least one non-transitory computer readable medium comprising instructions that in response to being executed on a computing device, causes the computing device to;

receive compressed frames of a sequence of audio data, video data, or both; place compressed frames of the frame sequence in a first buffer accessible to a time-ordered frame processing unit and accessible by a decoder:

determine whether or not frames already in the first buffer have a time stamp that meets a criteria associated with a clock associated with the time-ordered frame processing unit and wherein the criteria indicates whether or not the frames are on-time; move compressed frames from the first buffer into the second buffer that do not meet the criteria so that the second buffer only holds late or early frames that are not on-time while maintaining frames in the first buffer that do meet the criteria and comprising discarding one or more frames in the second buffer that do not meet the criteria when an on-time frame that meets the criteria is placed in the first buffer;

provide, by at least one processor, one or more frames of the sequence from the first buffer and to a decoder;

provide, by at least one processor, one or more frames of the sequence from second buffer and those frames of the sequence with a timestamp that do not meet the criteria, and provided to the decoder;

decode frames from the first buffer and second buffer to be rendered; and render the decoded frames at an audio speaker or video display.

12. The medium of claim 11 comprising providing the one or more frames from the second buffer when no frame meeting the criteria is available from the first buffer and to decode the frame(s).

13. The medium of claim 11, wherein the instructions cause the computing device to:

provide the one or more frames from the second buffer when no frame meeting the criteria is available from the first buffer and to process the frames by the time-ordered frame processing unit.

14. The medium of claim 11, wherein the instructions cause the computing device to determine whether the timestamp is within a margin of the clock value as the criteria.

15. The medium of claim 11, wherein the instructions cause the computing device to place at least one early frame in the second buffer when no capacity exists in the first buffer for the early frame regardless of timestamp value.

16. The medium of claim 11, wherein the instructions cause the computing device to provide frames from additional buffers so that the second buffer provides early frames while a third buffer provides late frames.

17. The medium of claim 11, wherein the capacity of both the first and second buffers is 1 to 6 frames.

18. The medium of claim 11, wherein both the first and second buffers have sub-buffers where one sub-buffer holds video data for frames and another sub-buffer holds audio data for frames.

19. The medium of claim 11, wherein the first and second buffers are parts of a single buffer.

20. The medium of claim 11, wherein the time-ordered frame processing unit is a decoder and the received frames are compressed frames.

* * * * *